US010132635B2

United States Patent
Kazemipur et al.

(10) Patent No.: US 10,132,635 B2
(45) Date of Patent: Nov. 20, 2018

(54) METHOD AND APPARATUS FOR MISALIGNMENT BETWEEN DEVICE AND PEDESTRIAN USING VISION

(71) Applicant: InvenSense, Inc., San Jose, CA (US)

(72) Inventors: Bashir Kazemipur, Calgary (CA); Zainab Syed, Calgary (CA); Jacques Georgy, Calgary (CA); Naser El-Sheimy, Calgary (CA)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 14/917,912

(22) PCT Filed: Sep. 17, 2014

(86) PCT No.: PCT/CA2014/000697
§ 371 (c)(1),
(2) Date: Mar. 9, 2016

(87) PCT Pub. No.: WO2015/039215
PCT Pub. Date: Mar. 26, 2015

(65) Prior Publication Data
US 2016/0216118 A1    Jul. 28, 2016

Related U.S. Application Data

(60) Provisional application No. 61/878,759, filed on Sep. 17, 2013.

(51) Int. Cl.
G06K 9/00    (2006.01)
G01C 21/16    (2006.01)
(Continued)

(52) U.S. Cl.
CPC ......... G01C 21/165 (2013.01); G01C 21/206 (2013.01); G06T 7/248 (2017.01); *G01B 11/002* (2013.01); *G06T 2207/30241* (2013.01)

(58) Field of Classification Search
CPC ...... H04N 19/513; H04N 19/51; H04N 5/144; G01C 21/12; G01C 21/20; G01C 21/206;
(Continued)

(56) References Cited

U.S. PATENT DOCUMENTS 7,379,566 B2 *  5/2008  Hildreth ............... G06F 1/1626
                                                 348/208.1
7,725,253 B2 *  5/2010  Foxlin .................. G01C 25/005
                                                 701/300
(Continued)

*Primary Examiner* — Aaron W Carter
(74) *Attorney, Agent, or Firm* — Bay Area Technology Law Group PC

(57) ABSTRACT

The present disclosure relates to a method and apparatus for determining the misalignment between a device and a pedestrian, wherein the pedestrian can carry, hold, or use the device in different orientations in a constrained or unconstrained manner, and wherein the device includes an optical sensor or camera. The optical sensors have a corresponding frame for the optical sensors' axes. The misalignment between the device and the pedestrian means the misalignment between the frame of the optical sensor assembly or camera in the device and the frame of the pedestrian. The present method and apparatus can work whether in the presence or in the absence of absolute navigational information updates (such as, for example, Global Navigation Satellite System (GNSS) or WiFi positioning).

9 Claims, 30 Drawing Sheets

(51) Int. Cl.
*G01C 21/20* (2006.01)
*G06T 7/246* (2017.01)
*G01B 11/00* (2006.01)

(58) Field of Classification Search
CPC .... G01C 25/005; G01C 21/165; G01C 21/06; G01B 21/22; G01B 11/002; G06T 7/20; G06T 7/248; G06T 2207/30241; G06F 17/30811; G01S 2205/008; G05D 1/0278
USPC .................. 382/103, 107; 701/408; 702/150
See application file for complete search history.

(56) References Cited

U.S. PATENT DOCUMENTS

| | | | |
|---|---|---|---|
| 9,752,879 B2* | 9/2017 | Al-Hamad | G01C 21/16 |
| 9,797,727 B2* | 10/2017 | Georgy | G01C 21/16 |
| 9,818,037 B2* | 11/2017 | Al-Hamad | G06K 9/3208 |
| 9,915,534 B2* | 3/2018 | Chang | G01C 22/002 |
| 2010/0053324 A1* | 3/2010 | Kim | G06F 3/011 |
| | | | 348/142 |
| 2012/0245839 A1* | 9/2012 | Syed | G01C 21/165 |
| | | | 701/408 |
| 2014/0022539 A1* | 1/2014 | France | G01C 15/00 |
| | | | 356/139.1 |
| 2014/0226864 A1* | 8/2014 | Venkatraman | G01C 21/20 |
| | | | 382/107 |
| 2014/0372026 A1* | 12/2014 | Georgy | G01S 19/47 |
| | | | 701/469 |
| 2015/0127259 A1* | 5/2015 | Kazemipur | G01C 21/00 |
| | | | 701/541 |
| 2015/0345952 A1* | 12/2015 | Chang | G01C 21/12 |
| | | | 701/541 |
| 2015/0354951 A1* | 12/2015 | Ali | G01C 21/16 |
| | | | 702/141 |
| 2015/0354962 A1* | 12/2015 | Georgy | G01C 21/20 |
| | | | 702/151 |
| 2016/0061605 A1* | 3/2016 | Georgy | G01C 21/165 |
| | | | 701/468 |
| 2016/0069690 A1* | 3/2016 | Li | G01C 21/206 |
| | | | 701/412 |
| 2016/0216112 A1* | 7/2016 | Georgy | G01S 19/47 |
| 2016/0216118 A1* | 7/2016 | Kazemipur | G01C 21/165 |
| 2016/0216119 A1* | 7/2016 | Omr | G01C 21/165 |
| 2016/0223334 A1* | 8/2016 | Georgy | G01S 19/47 |
| 2016/0224855 A1* | 8/2016 | Al-Hamad | G01C 11/04 |
| 2016/0305782 A1* | 10/2016 | Al-Hamad | G01C 21/16 |
| 2016/0313126 A1* | 10/2016 | Lemarchand | G01C 21/16 |
| 2017/0004630 A1* | 1/2017 | Al-Hamad | G01C 21/206 |
| 2017/0176188 A1* | 6/2017 | Georgy | G01C 21/005 |

* cited by examiner (a)

(b)

METHOD AND APPARATUS FOR MISALIGNMENT BETWEEN DEVICE AND PEDESTRIAN USING VISION

RELATED APPLICATIONS

This application claims the benefit of U.S. Provisional Patent Application No. 61/878,759 filed on Sep. 17, 2014, which is hereby incorporated by reference.

TECHNICAL FIELD

The present disclosure relates to a method and apparatus for determining the misalignment between a device and a pedestrian using vision, wherein the pedestrian can carry, hold, or use the device in different orientations in a constrained or unconstrained manner.

BACKGROUND

An inertial navigation system (INS) is one that uses inertial sensors attached to a moving platform to provide a navigation solution in terms of its position, velocity, and attitude (PVA) as it moves. Traditionally, the navigation device is firmly tethered to the moving platform so that the sensor axes are constrained to coincide with the forward, transversal, and vertical axes of the platform. In the event of improper sensor alignment (or misalignment), the inertial sensors will not measure the true motion of the platform but rather a component that is offset proportional to the degree to which the sensor and platform axes are misaligned. This, in turn, causes the positions and attitude calculated using the measurements from the inertial sensors to not be representative of the true state of the platform.

A portable navigation device, however, is inherently untethered and not constrained to any particular orientation with respect to the platform.

Existing portable navigation devices cannot achieve accurate position and attitude of the platform unless the absolute attitude angles for the device and the platform are known. Alternatively one can use the absolute attitude angle for the device and misalignment between the device and platform, or vice versa. The former approach requires a sensor assembly on both the device and platform and can be impractical for a portable navigation device. As such, knowledge of misalignment is a key factor in enabling an accurate navigation solution.

An exponential increase in functionality and reduction of size has led to widespread adoption of mobile navigation-capable devices such as smartphones and tablets. One notable feature is that these devices are increasingly being equipped with high-sensitivity Assisted Global Positioning System (AGPS) chipsets, which in addition to significantly improving the startup performance by utilizing network connection, also further use high sensitivity capabilities to provide an absolute position of the platform even in environments without a clear line of sight to the GPS satellites. In environments where AGPS information alone is not enough, such as downtown or deep indoors, one possible solution is to incorporate the use of one or more cell towers for a much coarser solution. These positioning methods are available in many mobile devices, however accurate indoor localization still presents a challenge and fails to satisfy the accuracy demands of current location based services (LBS). Additionally, these methods may only provide the absolute heading of the platform without any information on the device's heading.

Another notable feature of mobile navigation-capable devices is that many come equipped with Micro Electro Mechanical System (MEMS) sensors such as accelerometers and gyroscopes. These sensors have not been extensively used for navigation purposes due to their very high noise, large random drift rates, and the frequently changing orientations of the device with respect to the platform. They have hitherto been relegated to limited uses such as for screen control and entertainment applications. More feature-rich devices come equipped with magnetometers and it has been shown that a navigation solution using accelerometers and magnetometers may be possible if the user is careful enough to keep the device in a specific, unchanging orientation with respect to their body; however, this is not a common use case.

It is evident that there is a need for a method of accurately utilizing measurements from a navigation-capable device within a platform to determine the navigation state of the device/platform without any constraints on either the platform (i.e. in indoor or outdoor environments) or the mobility of the device within the platform (i.e. with no restriction on the device orientation). The needed method should allow the device to be tilted in any orientation while still providing seamless navigation information without a degradation in performance.

In addition to the above mentioned application of portable devices (that include a full navigation solution including position, velocity and attitude, or position and attitude), there are other applications (that may include estimating a full navigation solution, or an attitude only solution or an attitude and velocity solution) where the needed method is aimed at enhancing the user experience and usability, and may be applicable in a number of scenarios such as gaming or augmented reality applications.

Some currently existing misalignment estimation techniques calculate only discrete or pre-determined values of the misalignment angle, or a continuous misalignment angle over the full range of possibilities based on values obtained from inertial sensor measurements. There are scenarios in which inertial sensor-based methods fail to resolve the misalignment angle to the desired accuracy. Examples of such scenarios include those in which the device is undergoing very slow motion or the user of such devices walks with a problematic gait. Furthermore, as many of these sensors (especially those found in portable devices) suffer from the effects of various errors that change with time, they can be problematic for stable, long term device angle determination.

As such, there is a need for a method and apparatus to calculate the angle between the device and the platform that is able to work for any device usage or orientation with respect to the platform and that does not rely on the noisy inertial sensor measurements.

SUMMARY

The present disclosure relates to a method and apparatus for determining the misalignment between a device and a pedestrian, wherein the pedestrian can carry, hold, or use the device in different orientations in a constrained or unconstrained manner, and wherein the device includes an optical sensor or camera. The optical sensors have a corresponding frame for the optical sensors' axes. The misalignment between the device and the pedestrian corresponds to the misalignment between the frame of the optical sensor or camera in the device and the frame of the pedestrian. The present method and apparatus can work whether in the presence or in the absence of navigational information updates (such as, for example, Global Navigation Satellite System (GNSS) or WiFi positioning).

The present method and apparatus can work with various types of walkers with their different gaits and speeds. It can work with slow walking, normal walking or fast walking. Also, it can work with various types of runners with their different gaits and speeds.

The present method and apparatus can work with different device usages and orientations with respect to the pedestrian. For the purposes of this specification, the different usages and orientations of the device are defined as "device use cases". The use cases can include, for example: (i) handheld with all the different possible orientations including compass, texting portrait, texting landscape, or any arbitrary orientation (including any roll, pitch and heading); (ii) hand dangling (also called hand swinging) in any orientation whether horizontal or vertical, and in various types of dangling including very light, light, normal, or strong swinging; (iii) ear, which means the pedestrian holds the device on or near his ear for listening/talking in any orientation including horizontal, vertical or tilted. In all device usages and orientations, the present method can work with any roll, pitch, and azimuth (heading) angles of the device.

The present method and apparatus can be used to calculate a continuous misalignment angle covering the whole misalignment space, not just discrete or pre-determined values of such angle based on discrete use case classification of the device.

The present method and apparatus uses the optical flow calculations from images captured by the device camera to determine the misalignment angle. The present method and apparatus can be used to give an output at a rate equal to or less than the rate of image acquisition. In one embodiment, the present method can operate in real-time. First, the images are examined for whether they are sufficiently feature-rich to proceed with the calculations. Second, the images are examined to determine whether the device is static or in motion. If determined to be in motion, an optical flow calculation determines the amount of translation undergone between pairs of consecutively captured images. This translation is used to obtain the angle at which the first image is oriented with respect to the second image. This value is taken as the angle of the device with respect to the direction of motion, or misalignment angle. If the availability determination in the first stage determines that the images are not sufficiently featured to proceed with the optical flow calculation, the method cannot provide a correct misalignment angle and returns a "no decision".

In some embodiments, a Low Pass Filter (LPF) can be applied to the optical flow components to smoothen the components to reduce the variance of the final calculated misalignment angle.

In some embodiments, an optional routine to give a misalignment angle output in the case a "no decision" output is reached can be used; such an optional routine can be based on the history of any one or any combination of the following: (i) the optical flow components or (ii) the correct misalignment angle.

In some embodiments, an optional routine to enhance the misalignment angle calculation can be used. Such an optional routine can be based on the history of the optical flow components or the correct misalignment angle. In other embodiments, this routine can rely on smoothing, averaging or any type of filtering known to those skilled in the art, or any combination thereof, of any one or any combination of the above list of buffered quantities.

In some embodiments, an optional routine to integrate the misalignment angle obtained using vision with the misalignment angle obtained using other means such as inertial sensors using averaging or any type of filtering or state estimation known to those skilled in the art.

In some embodiments, an optional routine that calculates a standard deviation of the calculated misalignment angle can be used.

In some embodiments, an optional routine to enhance the misalignment angle calculation of the present method when absolute navigational information (such as for example GNSS or WiFi among others) is available and capable of calculating a pedestrian heading can be used.

In some embodiments, any one or any combination of the above-mentioned optional routines can be used.

Broadly stated, in some embodiments, a method for determining misalignment between a device and a pedestrian is provided, wherein the device includes a camera, the method including the steps of: a) image pre-processing; b) availability determination; c) static detection; d) calculation of optical flow components; e) determining the use case of the device; and f) calculating a misalignment angle using the optical flow components or declaring no decision. If the method declares no decision, then buffered information may be used to calculate the misalignment angle. The method may further include enhancing the misalignment angle using self-contained information or absolute navigational information. The method may further calculate a standard deviation for the calculated misalignment angle.

DESCRIPTION OF EMBODIMENTS

Figure 1:
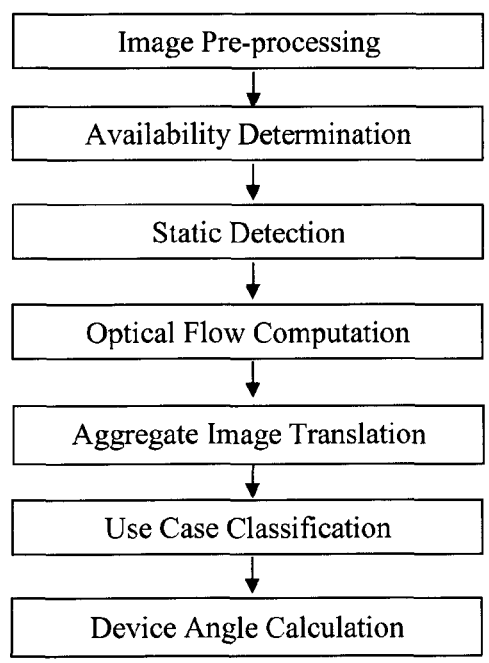
FIG. 1 shows a flowchart of one embodiment of the present method for misalignment determination.

The present disclosure relates to a method and apparatus for determining the misalignment between a device and a pedestrian, wherein the pedestrian can carry, hold, or use the device in different orientations in a constrained or unconstrained manner, and wherein the device includes an optical sensor or camera. The optical sensors have a corresponding frame for the optical sensors' axes. The misalignment between the device and the pedestrian corresponds to the misalignment between the frame of the optical sensor assembly or camera in the device and the frame of the pedestrian. The present method and apparatus can work whether in the presence or in the absence of navigational information updates (such as, for example, Global Navigation Satellite System (GNSS) or WiFi positioning).

In this document, a "pedestrian" is defined as a person on foot or performing on foot activites, such as, but not limited to, walking or running.

The present method and apparatus are for determining the misalignment between a device and pedestrian regardless of the type or style of the on foot activity of the pedestrian. For walkers, the present method works with various types of walkers with their different gaits and speeds. It can work with slow walking, normal walking or fast walking. For runners, it can work with various types of runners with their different gaits and speeds.

Absolute navigational information is information related to navigation and/or positioning and are provided by "reference-based" systems that depend upon external sources of information, such as for example Global Navigation Satellite Systems (GNSS). On the other hand, self-contained navigational information is information related to navigation and/or positioning and is provided by self-contained and/or "non-reference based" systems within a device/platform, and thus need not depend upon external sources of information that can become interrupted or blocked. Examples of self-contained information are readings from motion sensors such as accelerometers or gyroscopes.

The present method and apparatus works with different device usages and orientations with respect to the pedestrian. The different usages and orientations of the device will be referred to herein as use cases. The use cases are such as, for example: (i) handheld with all the different possible orientations including compass, texting portrait, texting landscape, or any arbitrary orientation (including any roll, pitch and heading); (ii) hand dangling (also called hand swinging) in any orientation whether horizontal or vertical, and in various types of dangling including very light, light, normal, or strong swinging; (iii) ear, which means the pedestrian holds the device on or near his ear for listening/talking in any orientation including horizontal, vertical or tilted; (iv) on the wrist (such as for example a smartwatch) in any orientation including horizontal, vertical or tilted; (v) head mounted (such as smart glasses, smart goggles, ear mounted systems, system on helmet, or any other sort of head mounted system); (vi) running with the device in any of the above use cases or tethered to any part of the body with any device orientation or tilt for example horizontal, vertical, or tilted in any pose, some examples are leg, arm, wrist, or any way of carrying. In all device usages and orientations the present method can work with any roll, pitch, and azimuth (heading) angles of the device.

The present method and apparatus is able to calculate a continuous misalignment angle covering the whole misalignment space, not just discrete or pre-determined values of such angle based on discrete use case classification of the device.

During normal use, the attitude of a device (e.g. portable phone) changes freely. Indeed, such devices often undergo rotational movements along any of their major axes (e.g. the x-axis, y-axis and z-axis) when positioned, for example, for texting in either landscape or portrait view or near a user's ear during phone use (these are examples when the device is a phone). One possible definition of axes is as follows, the forward axis of the device is defined as x-axis, the vertical or z-axis is pointing downward and the transversal axis or y-axis is defined in a way to complete the right handed coordinate system.

The orientation of a device within a platform (in the current disclosure a pedestrian carrying, holding or using the device) is not representative of the orientation of the platform or pedestrian. The device may undergo any number of rotational movements along any of its major axes, with respect to the platform. These rotational movements of the device do not indicate that the platform is going through the same changes in orientation. For example, the user or platform may be moving on a leveled 2D plane while the device may be undergoing any number of possible roll and pitch angles.

Typical portable devices include a tri-axial accelerometer for measuring accelerations or specific forces, along each of the sensitive axis, i.e., the x-axis, y-axis and the z-axis. The device may contain other sensors such as for example gyroscopes, magnetometers, barometer, among others.

Roll is defined as the rotation of the device along the forward x-axis, while pitch is the rotation along the lateral y-axis. Because the device user is free to rotate the device as desired, the device can have several changes in roll, pitch and azimuth (heading) with respect to the platform.

The presented method and apparatus uses measurements of the overall image translation as measured using optical flow between pairs of images captured by the device camera to estimate the misalignment angle. The presented method and apparatus is able to give an output at a rate equal to or less than the rate of image acquisition. In one embodiment, the presented method may take as input a buffer over a pre-determined duration of the following: images from the camera, the roll angle values, and the pitch angle values. In another embodiment, the method may be taking instantaneous sample values of the camera's view, the roll angle, and the pitch angle, and only buffering the needed quantities in the corresponding steps of the method.

First, each of the images captured, whether in the corresponding buffer or instantaneous, is pre-processed before proceeding further. The pre-processing stage reduces the image size, converts the color image to grayscale, applies smoothing to remove high spatial frequency noise and performs histogram equalization to mitigate changes in luminosity between frames.

After pre-processing, the method proceeds by checking whether the images are sufficiently feature-rich to proceed. The degree to which an image is feature-rich is dubbed the "Availability" of the image and quantified using the normalized value of the aggregated spatial derivative. If the images are suitably feature-rich (i.e. the normalized aggregated spatial derivative exceeds a threshold value), it is assessed whether the device is static or in motion by performing a check on the MSSIM index between a consecutive pair of images. The MSSIM index is a value between 0 and 1 that reflects whether a pair of images are completely different or identical, respectively. An MSSIM index value near unity would indicate that the images are nearly identical and implies that the device is stationary as the camera is looking at nearly the same scene in both images. Any device motion of sufficient magnitude would alter the scene that the camera is looking at and lower the MSSIM. With a sufficiently feature-rich image, the value of the MSSIM index is used to distinguish whether the device is being held static or is undergoing motion.

Once it is determined that the device is motion, the optical flow is calculated between the current image and previously acquired image. The optical flow calculation returns a flow map that provides an estimate of the mapping between each pixel in the first image and its corresponding location in the second image. Aggregating the flow map results in a tuple indicating the total amount of horizontal and vertical translation (in units of pixels) undergone by the first image to obtain the second image.

The aggregated optical flow values and/or the pitch and roll values are used to classify whether the device is undergoing non-periodic motion that is indicative of texting, calling, or vertical mode, or periodic motion that is indicative of dangling. The pitch and roll values may be calculated from any one of the following among others: (i) gyroscopes through any one of different methods such as for example quaternions, (ii) accelerometer readings or averaged accelerometer readings (whether fixed-time average or moving average), (iii) integrated navigation solution using any type of integration technique and integrating different sensors and/or systems such as for example some or all of the following: accelerometers, gyroscopes, magnetometers, barometers, odometers, or any navigational information updates (such as, for example, GNSS, WiFi, or any other wireless technique). The roll and pitch values used for levelling may be instantaneous sample values or may be time averaged values (whether fixed time average or moving average) whether buffered or fed to the presented method epoch by epoch (each epoch corresponds to an accelerometer reading sample).

In texting or calling mode (e.g. modes in which the device is facing the ground or a wall), the arctangent of the ratio of vertical to horizontal translation in the image stream provides the device angle. This is possible because the camera axis is aligned to the device axis.

In the vertical use case (e.g. those in which the device is upright and the camera is facing the end of hallway), the image stream suffers from a divergent optical flow field relative to the vanishing point of the image and requires the additional step of floor identification. The vanishing point is a point in the two-dimensional image plane that serves as the centre to which parallel lines in the three-dimensional world converge. The floor identification procedure partitions the image into a cell grid and uses only the flow values in the cell in which the floor is expected to be found to obtain the aggregate flow values. Thus, the device angle is determined using the arctangent of the ratio of vertical to horizontal translation in the floor region of the image stream.

In the dangling use case, the comparison of the cumulative flow value integrated over the positive and negative half-cycles of the dangling period is used to determine the device angle.

An optional step to make the buffered signals smooth; an LPF may be applied to the buffers.

An optional routine to give a misalignment angle output in case the main method gives a "no decision" output may be used; such routine is based on the history of any one or any combination of the following: (i) the buffered history of the corrected misalignment angle, (ii) the buffered history of the roll and pitch angles, (iii) the buffered history of the aggregated optical flow values, or (iv) the buffered history of the azimuth (heading) angle.

An optional routine to enhance the misalignment angle calculation may be used, such routine is based on the history of any one or any combination of the following: (i) the buffered history of the corrected misalignment angle, (ii) the buffered history of the roll and pitch angles, (iii) the buffered history of the aggregated optical flow values, or (iv) the buffered history of the azimuth (heading) angle. This routine may rely on smoothing, averaging, or any type of filtering of any one or any combination of the above list of buffered quantities.

In some embodiments, an optional routine may be used to integrate the misalignment angle obtained using vision with the misalignment angle obtained using other means such as inertial sensors using averaging or any type of filtering or state estimation known to those skilled in the art.

An optional routine that calculates a standard deviation of the calculated misalignment angle may be used. In one embodiment, this routine may rely on the consistency of any one or any combination of the following: (i) the buffered history of the corrected misalignment angle, (ii) the buffered history of the roll and pitch angles, (iii) the buffered history of the aggregated optical flow values, or (iv) the buffered history of the azimuth (heading) angle.

An optional routine to enhance the misalignment angle calculation of the present method when absolute navigational information (such as for example GNSS or WiFi among others) is available and capable of calculating a pedestrian heading may be used. This means having a redundancy of information, for example: (i) device heading from one or more its self-contained sensors, a fused version of its self-contained sensors, or from an integrated navigation solution; (ii) misalignment from the present method; (iii) pedestrian heading from the absolute navigational information. In one embodiment, the information from (i) and (iii) can be used to calculate another version of misalignment between device and pedestrian that can enhance, be integrated or fused with, be averaged or filtered with the misalignment from (ii). In another embodiment, the other version of misalignment between device and pedestrian calculated from (i) and (iii) can be used with a machine learning or training technique together with the misalignment from (ii) (especially when the misalignment from (ii) has a poor performance possibly indicated by the optional calculation of its standard deviation) to obtain better misalignment in the same use cases even if those use cases occurred later in a navigation session or trajectory when the absolute navigational information is blocked, interrupted or degraded. In yet another embodiment, both the preceding two ideas can both be applied in a third embodiment.

Any one or any combination of the optional routines can be used.

It should be noted that the present method may be used in a variety of applications including those that involve 2D or 3D navigation solutions including:
2D or 3D position, velocity and attitude or
only 2D or 3D position and attitude,
or partial 2D or 3D navigation solutions including:
only 2D or 3D velocity and attitude or
only 2D or 3D attitude.
In case of 2D solutions, attitude is only the azimuth (heading) angle.

As an example application, the present method may be used with a pedestrian dead-reckoning (PDR) solution. PDR needs a pedestrian heading (azimuth) together with step detection and step length. The sensors in the device (such as for example accelerometers, gyroscopes, and magnetometers) can only give the device heading (azimuth) not the pedestrian heading. These two are not the same and have a misalignment between them depending on the use case of the device. So, if there is no absolute navigational information (such as for example GNSS or WiFi), or if the quality or nature of any available absolute navigational information is not adequate or not capable of calculating a pedestrian heading, then misalignment between device heading and pedestrian heading is needed in order to calculate the pedestrian heading given the device heading obtained from its self-contained sensors. The calculated pedestrian heading will be used for PDR. Even in cases where absolute navigational information is available, and the device heading and the misalignment can be used to calculate a pedestrian heading to be used for PDR, then this solution can be integrated with the absolute navigational information to give a better solution that mitigates the drawbacks of both dead-reckoning and absolute navigational information. Any state estimation or filtering technique can be used for such integration.

In another example application, the misalignment angle from the present method can be used with any 2D or 3D navigation application wherein motion constraints that need this misalignment angle are applied to enhance the positioning or navigation solution (without any physical constraint on the usage of the device) such as, for example:
a. Non Holonomic Constraints (NHC): NHC is in the moving platform frame (which is here the pedestrian frame); so in order to apply NHC the transformation between the device frame and the pedestrian frame is needed which relies on the misalignment angle obtained by the present method.
b. PDR applied as a constraint to another integrated navigation solution whether a 2D or 3D navigation solution, thereby providing improved positioning performance with low-cost sensors rather than general inertial navigation. The dependence of PDR on the misalignment angle calculated by the present method is explained earlier. In general, the PDR results can be used in any of the following ways:
    i. To provide measurement updates for the navigation solution (in addition to the possible calculation of the standard deviations for these updates),
    ii. To be integrated with the navigation solution in a Least Squares sense, or
    iii. Used as the only standalone positioning and navigation solution (as described above).
c. Map constraints: if environment maps (of any type) are available, the map constraints can be used to enhance the navigation solution. In order to use such constraints the pedestrian heading is needed, which can be calculated from the device heading and the misalignment calculated by the present method. If there is no absolute navigational information (such as for example GNSS or WiFi), or if the quality or nature of any available absolute navigational information is not adequate or not capable of calculating a pedestrian heading, then misalignment between device heading and pedestrian heading is used to calculate the pedestrian heading given the device heading obtained from the self-contained sensors. The calculated pedestrian heading will be used for the map constraint for the navigation solution. Even in cases where absolute navigational information is available, the device heading and the misalignment can be used to calculate a pedestrian heading to be further integrated with the absolute navigational information to give a better solution. The map constraints to enhance a navigation solution can be used if PDR is utilized to further enhance the solution, or can be used if PDR is not used to enhance the main navigation solution.

When the method presented herein is combined in any way with a navigation solution whether 2D or 3D, this navigation solution can use any type of state estimation or filtering techniques. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example a loosely coupled integration scheme or a tightly coupled integration scheme among others. The navigation solution may utilize modeling (whether with linear or non-linear, short memory length or long memory length) and/or automatic calibration for the errors of inertial sensors and/or other sensors used.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the method and apparatus presented above may be used with a navigation solution that may optionally utilize automatic zero velocity periods or static period detection with possible zero velocity updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and may also be used with a backward smoothing module with any type of backward smoothing technique and either running in post mission or in the background on buffered data within the same mission.

It is further contemplated that the method and apparatus presented above can also be combined with a mode of conveyance technique or a mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that the method and apparatus presented above can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the method and apparatus presented above can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the method and apparatus presented above can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements, such enhancement is the carrier-smoothed pseudorange.

It is further contemplated that the method and apparatus presented above can also be used with a navigation solution that relies on an ultra-tight integration scheme between GNSS receiver and the other sensors' readings.

It is further contemplated that the method and apparatus presented above can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the method and apparatus presented above can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the method and apparatus presented above can also be used with various types of inertial sensors, other than MEMS based sensors described herein by way of example.

Without any limitation to the foregoing, the embodiments presented above are further demonstrated by way of the following examples.

EXAMPLES

Example 1—Device Angle Using Optical Flow

The example operates in four stages: image pre-processing, availability determination, static detection, and device angle calculation. FIG. 1 provides a high level overview and a description of each stage follows.

Image Pre-Processing

Image processing is a computationally intensive task and optimizations must be made if the derived techniques are intended to be used in real-time. Furthermore, the amount of light entering a vision sensor is highly variable and dependent on an environment that the system has little to no control over. These facts make it useful to pre-process the images being input into the device angle calculation module. The pre-processing stage consists of four sub-stages: (1) size reduction, (2) grayscale conversion, (3) histogram equalization, and (4) image smoothing.

Size Reduction

Modern digital cameras are capable of acquiring images at an unprecedentedly high size and resolution. These images are typically at a size of 1280×720 pixels and 24-bit color depth (or bits per pixel). At a size of 1280×720, the optical flow routine, the primary bottleneck in the technique runtime, may take nearly two seconds to process each frame. A reduction in image size necessarily involves downsampling of the image data and the associated information loss. Care must be taken that the images are reduced to a size suitable for real-time performance while the results maintain a strong correspondence with the results obtained using the original full-size images. The value of the device angle calculated using optical flow measurements with images of various sizes were tested. There is still a great degree of correspondence for the obtained device angle between images at 10% and original resolution. By reducing the image size to 128×72, a 60 times speedup is obtained with no significant loss of information.

Grayscale Conversion

Grayscale conversion is a pre-processing step that serves to radically reduce the complexity of the optical flow calculation. Rather than computing optical flow for each of the red, green, and blue colour channels that constitute a digital image, the information from all three channels can be represented as a single grayscale image. Grayscale conversion reduces the size of the matrices used in many areas of the entire technique by decomposing a 24-bit colour image into an 8-bit grayscale image.

The conversion proceeds as follows. Let $I_k(x,y)$ and $I_{k-1}(x,y)$ represent two color images of size $N_x$ by $N_y$ within an image sequence where x and y represent the spatial coordinates within the image and k represents the temporal coordinate of the frame within the sequence. The value at every (x,y) location in $I_k$ and $I_{k-1}$ is a triplet whose individual elements indicate the 8-bit integer (i.e. 0-255) intensity value of each of the red, green, and blue (RGB) color channels in the form (r, g, b). In order to simplify the next step, we can equivalently represent each image by three $N_x \times N_y \times 1$ arrays. Each array holds the 8-bit intensity value for one the three RGB color channels. That is, the three-channel colour image $I_k(x,y)$ can be decomposed into the three single-channel (i.e. single-colour) arrays $r_k(x,y)$, $g_k(x,y)$, and $b_k(x,y)$. Letting $G_k$ represent a single-channel grayscale image, we obtain $G_k$ as per the Rec. 601 formula used in the NTSC and PAL television standards:

$$G_k(x,y)=0.299 r_k(x,y)+0.587 g_k(x,y)+0.114 b_k(x,y)$$

where i=0, 1, . . . , $N_x$−1 and j=0, 1, . . . $N_y$−1.

Histogram Equalization

After conversion to grayscale, histogram equalization is applied to increase image contrast. As optical flow aims to measure the translation undergone by regions of brightness in the image, having a greater distinction between these regions serves to improve the flow calculation. The process begins with the creation of the image histogram—a count of the number of pixels at each of the 256 intensity values. The equalization routine then creates a new image with a "stretched" version of the histogram so as to span the full intensity range (0-255) rather than being clustered tightly around a somewhat central value. More intuitively, this serves to convert a predominantly grey image to one that spans the entire grayscale palette from black to white.

The mathematical description of the histogram equalization process is as follows. Let $f$ be a given image represented as a $m_r$ by $m_c$ matrix of integer pixel intensities ranging from 0 to L−1. L is the number of possible intensity values, often 256. Let p denote the normalized histogram of $f$ with a bin for each possible intensity. So $$p_n = \frac{\text{number of pixels with intensity } n}{\text{total number of pixels}}$$

$$n = 0, 1, \ldots, L-1$$

The histogram equalized image g will be defined by $$g_{i,j} = \text{floor}\left((L-1)\sum_{n=0}^{f_{i,j}} p_n\right)$$

where floor( ) rounds down to the nearest integer. This is equivalent to transforming the pixel intensities, k, of $f$ by the function $$T(k) = \text{floor}\left((L-1)\sum_{n=0}^{k} p_n\right)$$

Image Smoothing

A consequence of increasing contrast via histogram equalization is that noise is enhanced as well, effectively lowering the signal to noise ratio in the image. This noise is generally of a high spatial frequency and can be removed by lowpass filtering or smoothing the image. Image smoothing is performed using two-dimensional convolution. Convolution is an operation on two functions $f$ and $g$, which produces a third function that can be interpreted as a modified ("filtered") version of $f$. In the case of image smoothing, we call $f$ the image and $g$ the smoothing kernel. The result of the convolution is a smoothed copy of the image $f$. Formally, for functions $f(x)$ and $g(x)$ of a continuous variable x, convolution is defined as:

$$f(x) * g(x) = \int_{-\infty}^{\infty} f(\tau)g(x-\tau)d\tau$$

where * means convolution. For functions of a discrete variable x:

$$f[x] * g[x] = \sum_{k=-\infty}^{\infty} f[k]g[x-k]$$

For functions of two variables x and y (e.g. images), these definitions become:

$$f(x) * g(x) = \int_{-\infty}^{\infty}\int_{-\infty}^{\infty} f(\tau_1, \tau_2) d\tau_1 g(x-\tau_1, y-\tau_2) d\tau_2$$

and $$f[x, y] * g[x, y] = \sum_{k_1=-\infty}^{\infty}\sum_{k_2=-\infty}^{\infty} f[k_1, k_2]g[x-k_1, y-k_2]$$

Many types of smoothing schemes exist (homogenous, Gaussian, median, bilateral, etc.) and each is suited for noise of a particular distribution. In the case of homogenous smoothing, averaging the two neighbouring pixels in each direction would be performed using the 5×5 convolution kernel K:

$$K = \frac{1}{25}\begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

Assuming that the image noise may exhibit a Gaussian distribution and Gaussian smoothing may be applied. The appropriate kernel to be used is found using the 2D Gaussian function G:

$$G(x, y) = \frac{1}{2\pi\sigma^2} e^{-\frac{x^2+y^2}{2\sigma^2}}$$

where x and y are the distances from the origin in the horizontal and vertical axes, respectively, and σ is the standard deviation of the Guassian distribution. Using the Gaussian function to build a 5×5 smoothing kernel with σ=1, we have:

$$K = \frac{1}{273}\begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 1 \end{bmatrix}$$

The smoothed image is given by the convolution of the grayscale image with the smoothing kernel.

Availability Determination

Availability is a measure of the homogeneity of an image (i.e. a measure of how feature-rich an image is) and is based on the derivative, or gradient, of the image. The reason for checking availability in the first stage of the method is to ensure that the captured images have sufficient features to be used for reliable optical flow measurements. The first spatial derivative of an image can be obtained by convolving the image with a filter such as the Sobel filter and aggregating the result across the image. The Sobel operator uses two 3×3 kernels which are convolved with the original image to calculate approximations of the horizontal and vertical derivatives. With $f$ as the source image, the horizontal and vertical derivative approximations $G_x$ and $G_y$ are given as:

$$G_x = \begin{bmatrix} -1 & 0 & 1 \\ -2 & 0 & 2 \\ -1 & 0 & 1 \end{bmatrix} * f, G_y = \begin{bmatrix} -1 & 2 & 1 \\ 0 & 0 & 0 \\ -1 & 2 & 1 \end{bmatrix} * f$$

where * here denotes the 2-dimensional convolution operation described in the image smoothing section above.

The resulting gradient approximations in each direction can be combined to give the overall gradient magnitude G:

$$G = \sqrt{G_x^2 + G_y^2}$$

Using this information, the aggregated gradient D is calculated across the entire image:

$$D = \sum_{j=0}^{N_y-1} \sum_{i=0}^{N_x-1} G[i, j]$$

A small aggregated derivative value D implies high homogeneity and a lack of features that can be used for the subsequent optical flow calculations. A high derivative value implies a less homogeneous image (i.e. greater variation with the image). Large intensity fluctuations are indicative of objects being within the field of view. The presence of multiple objects allows for a more reliable optical flow estimate. The aggregated derivative value D can be normalized by dividing by the aggregated maximum intensity change between each pixel (i.e. 0-255) in the entire image to get $D_{norm}$:

$$D_{norm} = \frac{D}{(N_x * N_y) * 255}$$

Static Detection

Static detection is performed based on the value of the Mean Structural Similarity Index (MSSIM). The MSSIM is a singular value that quantifies the degree to which two images match in luminance, contrast, and structure. For two input signals x and y, the SSIM within a window m of size N×N is given as:

$$SSIM(x_m, y_m) = \frac{(2\mu_x\mu_y + C_1)(2\sigma_{xy} + C_2)}{(\mu_x^2 + \mu_y^2 + C_1)(\sigma_x^2 + \sigma_y^2 + C_2)}$$

where $\mu_x$ and $\mu_y$ are the means of $x_m$ and $y_m$, $\sigma_x^2$ and $\tau_y^2$ are the variance of $x_m$ and $y_m$, $\sigma_{xy}$ is the covariance between $x_m$ and $y_m$, and $C_1$ and $C_2$ are stabilizing coefficients. Taking the mean value across all M windows used to construct the structural similarity array, the MSSIM is given as $$MSSIM(x, y) = \frac{\sum_{m=1}^{M} SSIM(x_m, y_m)}{M}$$

An MSSIM value of zero indicates two completely unrelated pictures while a value of one indicates that the pictures are identical. Because a static feature-rich scene and a moving feature-less scene would both result in a high MSSIM, it is not sufficient to check the MSSIM value alone for static detection. If the MSSIM value of the images are found to be above a set threshold, the method proceeds with a check on the homogeneity. High homogeneity (i.e. small derivative value) scenes indicate that the images will not provide meaningful optical flow information as they are largely uniform. High derivative values indicate that the scene is feature-rich and can be used for a reliable optical flow estimate.

Optical Flow Calculation

The smoothed grayscale images are supplied as arguments to the optical flow calculation routine. The output of the optical flow routine is based on the brightness constancy constraint, which is the assumption that changes in pixel intensities are only due to small translational motions in the time interval between images. Formally, brightness constancy states is the assumption that a pixel at location (x, y, t) with intensity I(x, y, t) will have moved by $\Delta x$ and $\Delta y$ in the time interval between images $\Delta t$:

$$I(x,y,t) = I(x+\Delta x, y+\Delta y, t+\Delta t)$$

Assuming the movement to be small, the brightness constancy equation can be expanded using a Taylor series. To a first-order approximation:

$$I(x + \Delta x, y + \Delta y, t + \Delta t) = I(x, y, t) + \frac{\partial I}{\partial x}\Delta x + \frac{\partial I}{\partial y}\Delta y + \frac{\partial I}{\partial t}\Delta t$$

It follows that:

$$\frac{\partial I}{\partial x}\Delta x + \frac{\partial I}{\partial y}\Delta y + \frac{\partial I}{\partial t}\Delta t = 0$$

Dividing each term by the time interval $\Delta t$:

$$\frac{\partial I}{\partial x}\frac{\Delta x}{\Delta t} + \frac{\partial I}{\partial y}\frac{\Delta y}{\Delta t} + \frac{\partial I}{\partial t}\frac{\Delta t}{\Delta t} = 0$$

results in $$\frac{\partial I}{\partial x}u_x + \frac{\partial I}{\partial y}u_y + \frac{\partial I}{\partial t} = 0$$

where $u_x$ and $u_y$ are the x and y components of the velocity and referred to as the optical flow, $$\frac{\partial I}{\partial x} \text{ and } \frac{\partial I}{\partial y}$$

are the spatial derivatives of the image intensities and $$\frac{\partial I}{\partial t}$$

is the temporal derivative.

This is an equation in two unknowns and cannot be solved without another set of equations. This is otherwise known as the "aperture problem". One widely used approach to solving the aperture problem (and the one described below) is the tensor-based Farnebeck method using polynomial expansion. This method approximates each neighbourhood of each pixel in each frame using second-degree polynomials and estimates displacements from knowing how these polynomials change under translation. An overview of polynomial expansion and displacement estimation follows.

Polynomial Expansion

The idea of polynomial expansion is to approximate the area surrounding each pixel with a quadratic polynomial $f_1$ of the form:

$$f_1(x) = x^T A_1 x + b_1^T x + c_1$$

where A is a symmetric matrix, b a vector and c a scalar. The three coefficients are estimated from a weighted least squares fit to the intensity values in a defined area. The weighting has two components called certainty and applicability that determine which regions of the image are involved in the calculation and the size of the structures that will be represented by the expansion coefficients, respectively.

Displacement Estimation

The premise of polynomial expansion is to approximate areas surrounding the pixels by a polynomial. Letting $f_1$ undergo an ideal global displacement d, we obtain $f_2$:

$$f_2(x) = f_1(x-d)$$
$$= (x-d)^T A_1 (x-d) + b_1^T (x-d) + c_1$$
$$= x^T A_1 x + (b_1 - 2A_1 d)^T x + d^T A_1 d - b_1^T d + c_1$$
$$= x^T A_2 x + b_2^T x + c_1$$

Equating the coefficients of $f_1$ and $f_2$:

$$A_2 = A_1$$
$$b_2 = b_1 - 2A_1 d$$
$$c_2 = d^T A_1 d - b_1^T d + c_1$$

Re-arranging the equation for $b_2$, vie can solve for the translation d:

$$d = -\tfrac{1}{2} A_1^{-1}(b_2 - b_1)$$

Aggregate Image Translation

The output of the optical flow routine is the flow map $F_k(x,y)$ where each element is a tuple indicating an estimate of the translational motion (dx,dy) undergone by the intensity value at location (x,y) between images $G_k$ and $G_{k-1}$. We can split the dual-channel flow map F into two single-channel matrices $dx_k(x,y)$ and $dy_k(x,y)$. All x- and y-components of the flow map elements are summed to provide the aggregate translation, $dx_{agg,k}$ and $dy_{agg,k}$, between images $G_k$ and $G_{k-1}$ respectively. That is, $$dx_{agg,k} = \sum_{j=0}^{N_y - 1} \sum_{i=0}^{N_x - 1} dx_{agg,k}[i,j]$$

$$dy_{agg,k} = \sum_{j=0}^{N_y - 1} \sum_{i=0}^{N_x - 1} dy_{agg,k}[i,j]$$

Texting/Calling Use Case vs. Dangling Use Case Classification

The values of the aggregate translation are used to create a binary thresholded signal:

$$dx_{agg,k}^{binary} = \begin{cases} 1 & \text{if } dx_{agg,k} > 0 \\ -1 & \text{if } dx_{agg,k} < 0 \\ dx_{agg,k-1}^{binary} & \text{if } dx_{agg,k} = 0 \end{cases}$$

$$dy_{agg,k}^{binary} = \begin{cases} 1 & \text{if } dy_{agg,k} > 0 \\ -1 & \text{if } dy_{agg,k} < 0 \\ dy_{agg,k-1}^{binary} & \text{if } dy_{agg,k} = 0 \end{cases}$$

Differencing the binary thresholded flow from the previous step allows us to determine the transition points (if any) between forward and backwards movement:

$$D_{x,k} = dx_{agg,k}^{binary} - dx_{agg,k-1}^{binary}$$

$$D_{y,k} = dy_{agg,k}^{binary} - dy_{agg,k-1}^{binary}$$

Periodic spikes should be observed within the differenced signal from the previous step if the device is dangling. In other words, we can determine the dangling use case by looking for peaks in the magnitude spectrum M of the Fourier transform Y of the differenced signal D over a window of N images where:

$$Y_{x,m} = \sum_{j=0}^{N-1} D_{x,j} \omega_N^{(j-1)(m-1)}$$

$$Y_{y,m} = \sum_{j=0}^{N-1} D_{y,j} \omega_N^{(j-1)(m-1)}$$

where $\omega_N = e^{(-2\pi i)/N}$ is an Nth root of unity, and the magnitude spectrum is given by $$M_x = 2|Y_{x,m}|$$

$$M_y = 2|Y_{y,m}|$$

The magnitude spectrum is thresholded and if a peak is found above a set threshold in the frequency range of [0.5, 1.5] Hz, the use case is classified as dangling. The frequency of the peak is taken as the dangling frequency, $f_{dangling}$. If a peak was not found, the use case is classified as texting/calling.

Device Angle Calculation

Texting Use Case

Figure 2:
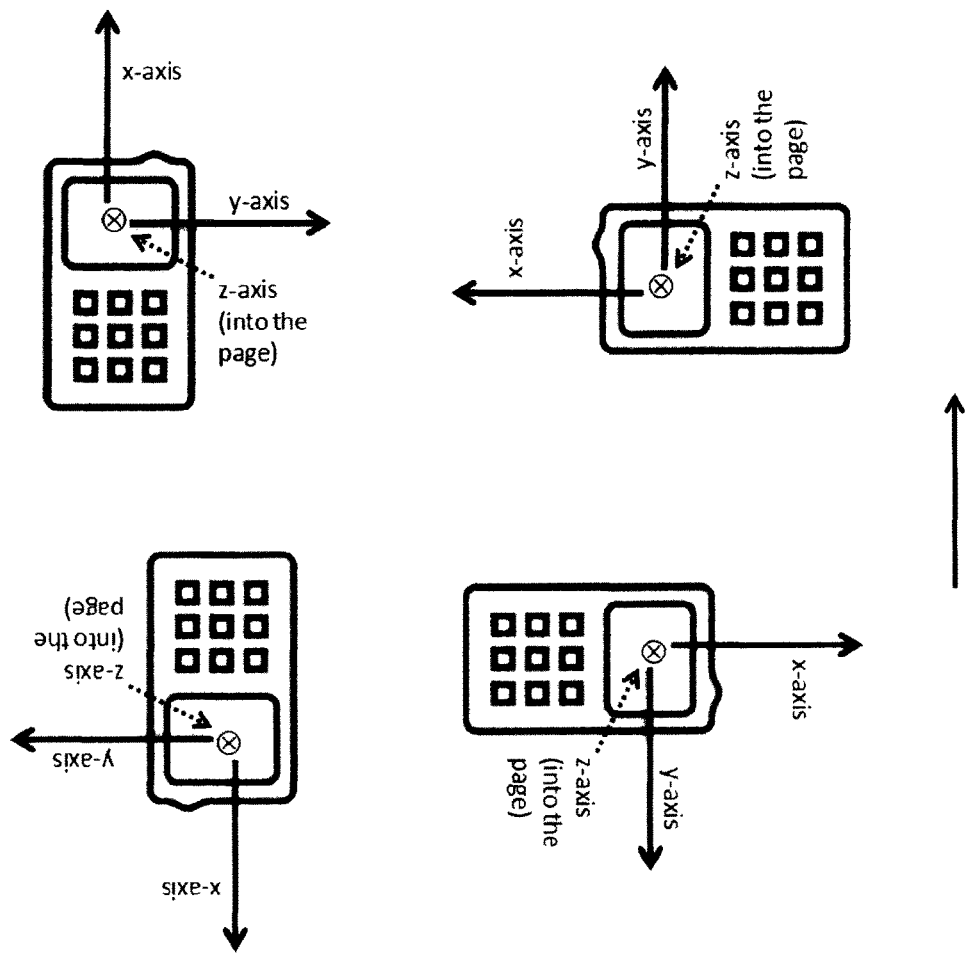
FIG. 2 shows device angles of 0, 90, 180, and −90 degrees with respect to the direction of motion indicated by the black arrow (shown left to right).

If the use case has been classified as texting/calling, the device angle, $\theta_k$, is computed using the values of the aggregate x- and y-translations. Examples of some device orientations for the texting use case can be found in FIG. 2, together with the device axes. The device angle is given by $$\theta_k = a\tan 2(dy_{agg,k}, dx_{agg,k})$$

Vertical Use Case

Figure 3:
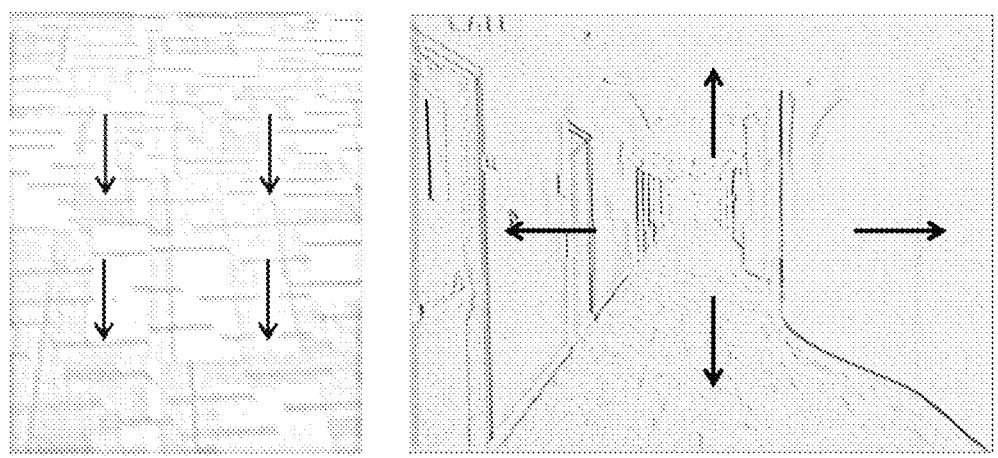
FIG. 3 shows the uniform optical flow field obtained when the device is in the texting use case, and divergent optical flow obtained when the device is in the vertical use case.

In the vertical use case (e.g. walking down a hallway), using the entire image for the optical flow calculation will lead to incorrect values for the device angle. In the texting and calling use cases, all pixels in the image undergo a translation in approximately the same direction and this allows the entire image to be used for the calculation of device orientation. In the vertical use case, the optical flow routine returns a non-uniform flow map that diverges outwards from a central location known as the "vanishing point" of the image. An example is found in FIG. 3.

Figure 4:
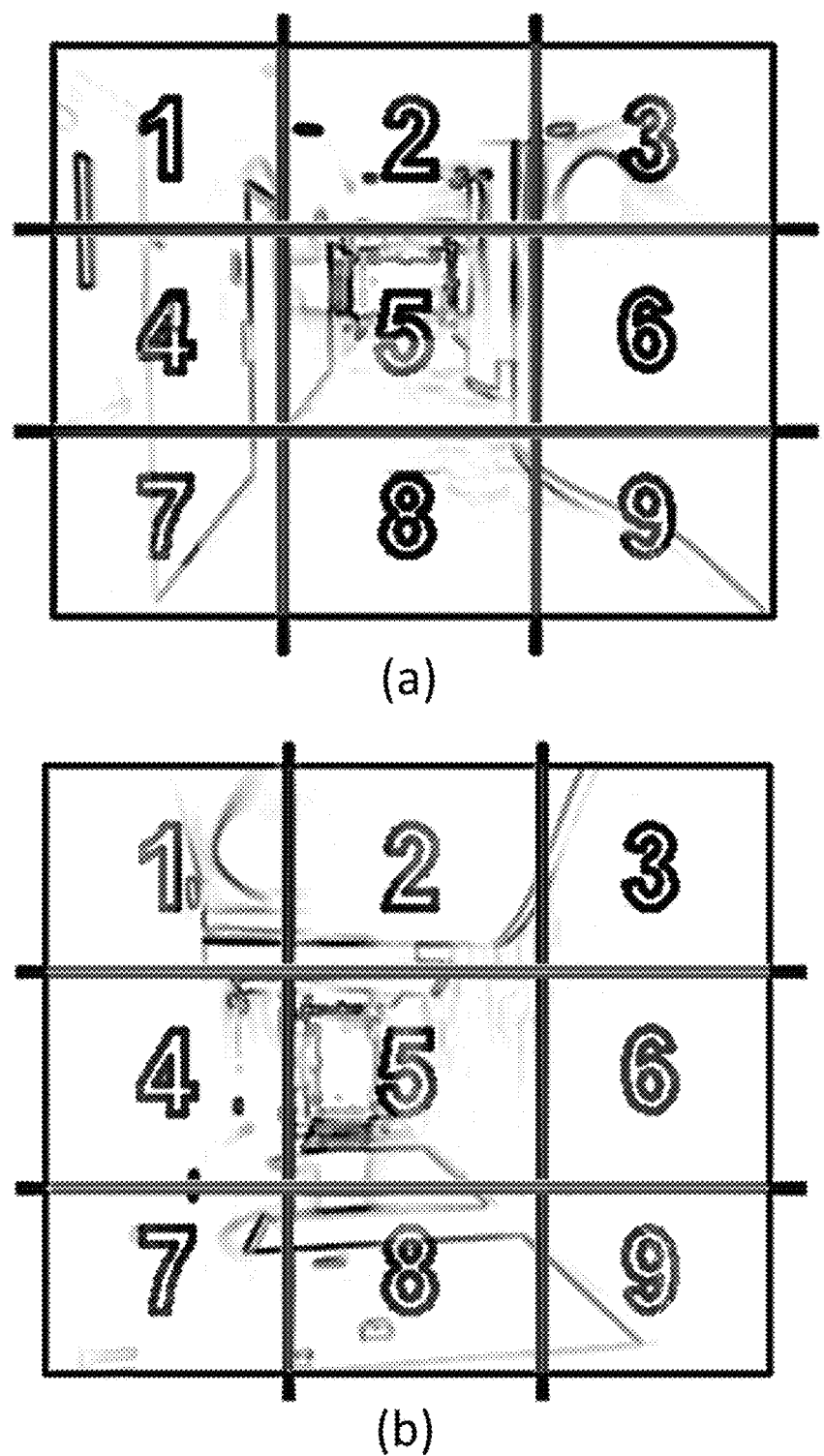
FIG. 4 shows an exemplary camera view when the device is held in the vertical use case at an angle of (a) zero degrees and (b) 90 degrees. The appropriate cell to use for the optical flow calculation is cell 8 for (a) and cell 6 for (b).

As it is the translation undergone by the region of the image in which the ground or floor is located that is indicative of the device orientation, the area of the image representing the ground or floor must be identified and used in the optical flow calculation to obtain the correct value of the device angle. A simple and effective strategy for determining the location of the floor region is to partition the image into, for example, a 3×3 grid of equally-sized cells. With the device held at an angle of zero degrees, the floor is typically in the bottom-most middle cell. FIG. 4 shows the partitions for two common orientations when the device is held in the vertical use case at an angle of (a) zero degrees and (b) 90 degrees. The appropriate cell to use for the optical flow calculation is cell 8 for (a) and cell 6 for (b).

If the use case has been classified as vertical, the device angle, $\theta_k$, is computed using the values of the aggregate x- and y-translation of the identified ground or floor region:

$$\theta_k = a\tan 2(dy_{agg,k}^{floor}, dx_{agg,k}^{floor})$$

Calling Use Case

If the use case has been classified as calling, the device angle calculation proceeds as follows. Edge detection is performed on the image in order to identify the boundary between the ground and wall planes, as well as the boundary between the wall and ceiling planes. These two lines are examined for their parallelism, the degree to which they are parallel with respect to each other. If the ground-wall and wall-ceiling edges exhibit a high degree of parallelism, the device angle can be taken as zero degrees. If the ground-wall and wall-ceiling edges slope towards each other, the slopes of the lines are used to find the intersection point. The magnitude of the device angle will be inversely proportional (and can be tuned with a scale factor) to the distance between the intersection point and the centre of the image. The location of the intersection point of the two lines, whether it is behind or ahead of the image (with respect to the direction of motion) signifies whether the device angle is positive or negative, respectively.

Dangling Use Case

If the use case has been classified as dangling, the device angle calculation proceeds as follows. The differencing of the binary thresholded aggregate flow ($D_x$ and $D_y$) and/or the maximum and minimum peaks in either the pitch or roll signals from the device's on-board IMU are used to obtain the transition points between the start of the forward and backward dangling half-cycles.

If the magnitude of the cumulative x flow over the full cycle is greater than that of the cumulative y flow over the full cycle and/or if the pitch is found to have a larger periodic signal than roll and/or if the x-flow exhibits greater periodicity than the y-flow (as shown by the magnitude spectrum of the differenced binary thresholded signal), the absolute values of the aggregated x-flows in each half-cycle are integrated. If the cumulative x-flow, $dx_{cum}$, during the positive half cycle (PHC) is greater than the cumulative x-flow in the negative half-cycle (NHC), this indicates that the device is in the direction of the motion and the device angle is taken to be 0 degrees. Otherwise, the device is oriented against the direction of motion and the device angle is taken to be 180 degrees. That is, $$\theta_k = \begin{cases} 0 & \text{if } dx_{cum} \text{ in } PHC > dx_{cum} \text{ in } NHC \\ 180 & \text{else} \end{cases}$$

If the magnitude of the cumulative x flow over the full cycle is less than that of the cumulative y flow over the full cycle and/or if the roll is found to have a larger periodic signal than pitch and/or if the y-flow exhibits greater periodicity than the x-flow (as shown by the magnitude spectrum of the differenced binary thresholded signal), the absolute values of the aggregated y-flows in each half-cycle are integrated. If the cumulative y-flow during the negative half cycle is greater than the cumulative y-flow in the positive half-cycle, the device angle is taken to be +90 degrees. Otherwise, the device angle is taken to be −90 degrees. That is, $$\theta_k = \begin{cases} 90 & \text{if } dy_{cum} \text{ in } NHC > dy_{cum} \text{ in } HC \\ -90 & \text{else} \end{cases}$$

Figure 5:
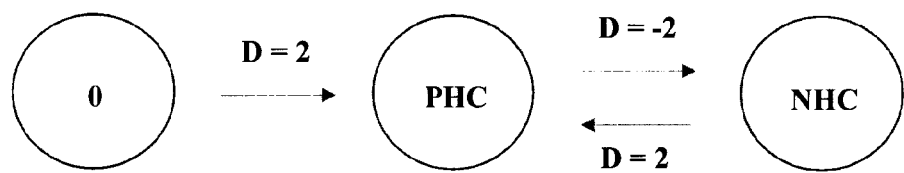
FIG. 5 shows an example state machine used for determining positive and negative half-cycles of the dangling motion.

A state machine can be used to keep track of whether we are currently in the positive or negative half cycles of the dangling motion. An example state machine can be found in FIG. 5. Beginning in the initialization state, a positive spike in the differenced binary thresholded flow signal (a value of +2) indicates that the device is experiencing a change from negative to positive flow and transitions the system to the PHC state. During the PHC state, a negative spike in the differenced binary thresholded flow signal (a value of −2) transitions the system to the NHC state, whereupon a positive spike transitions the system back to the PHC state. The x- and y-flow values are integrated in each half-cycle and used in accordance with equations above to obtain a value for the dangling use case device angle.

Example 2—Availability and Static Determination Results

The first test was 40 seconds in duration and consisted of four 10-second segments. From 0-10 seconds, the device was held statically in front of a wall of uniform color. From 10-20 seconds, the device was in motion in front of the same wall. From 20-30 seconds, the phone was held static while facing the ground in an office environment. From 30-40 seconds, the device was in motion facing the same floor.

Figure 6:
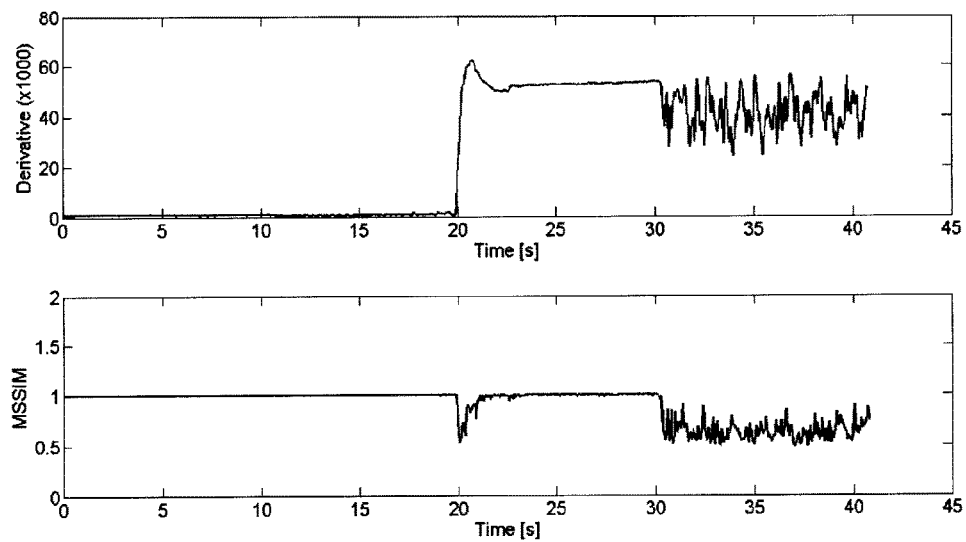
FIG. 6 shows the spatial derivative and MSSIM values.
Figure 7:
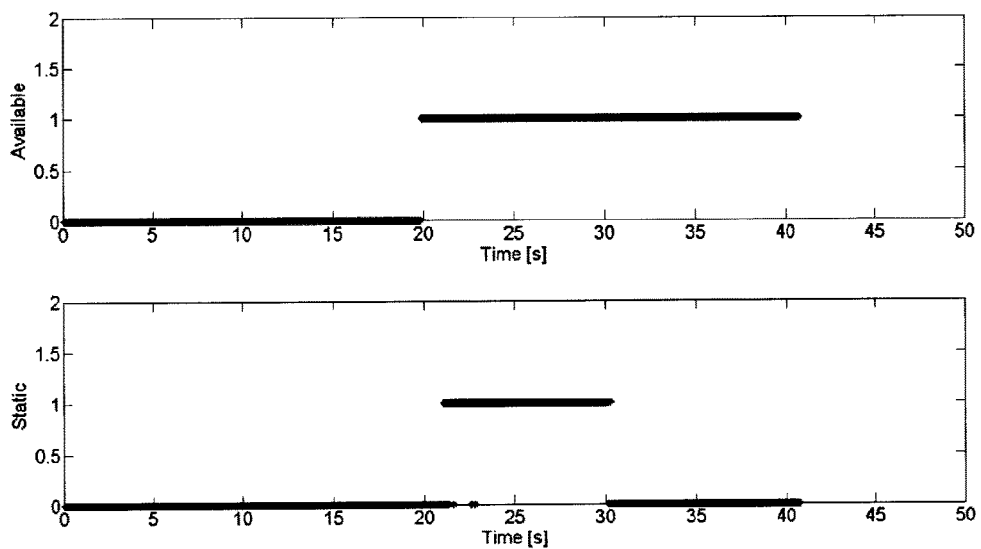
FIG. 7 shows the availability and static indicators.

Examining the values of the aggregated intensity gradient and MSSIM in FIG. 6, we see that both parameters are nearly identical for the static and moving cases when the camera is facing a uniform, featureless surface. No meaningful optical flow information is obtained in these cases and the vision module is deemed unavailable in this context. With the device held statically facing a feature-rich environment, we see a significantly higher (largely constant) value of the aggregated intensity gradient while the MSSIM stays close to 1 as in the previous case. The intensity gradient begins to fluctuate around a large value while the MSSIM exhibits fluctuations around a value smaller than 1 for the case of a moving device in a feature-rich environment. Thresholding the values in FIG. 6 gives the device status as shown in FIG. 7.

Example 3—Misalignment Calculation Results

Texting Use Case

Figure 8:
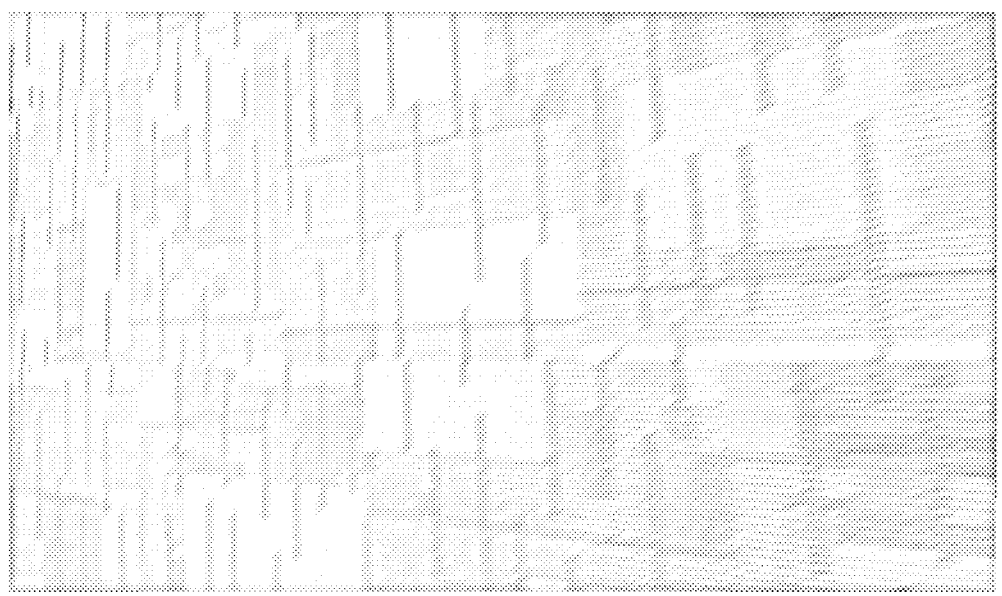
FIG. 8 shows the camera view when the device is in the texting use case at an angle of zero degrees.

In this trajectory the user walked forward and rotated the device counter clockwise in 90 degree increments after approximately 4 seconds in each orientation. FIG. 8 shows the camera view when the device is in the texting use case at an angle of zero degrees.

Figure 9:
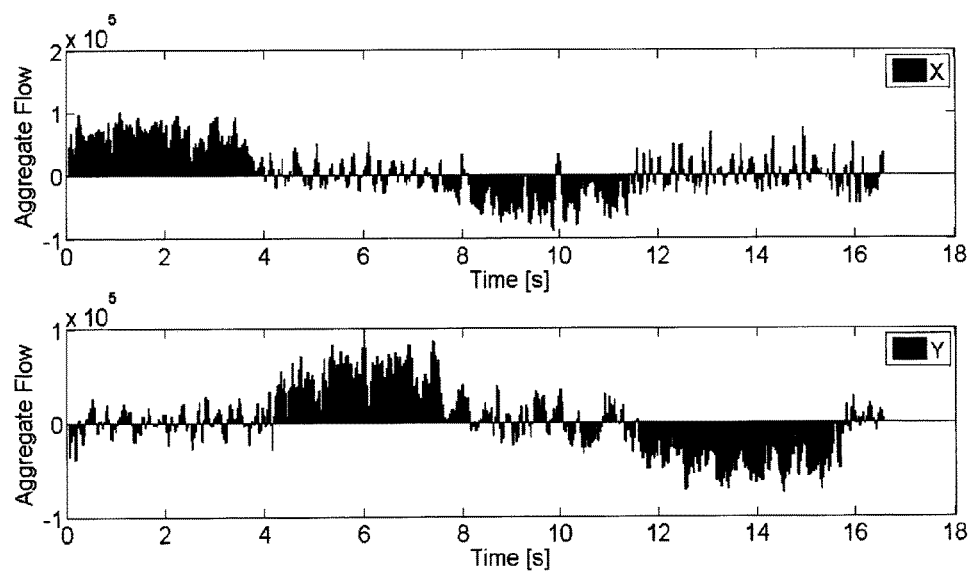
FIG. 9 shows the x- and y-components of the aggregate flow for the texting use case trajectory.
Figure 10:
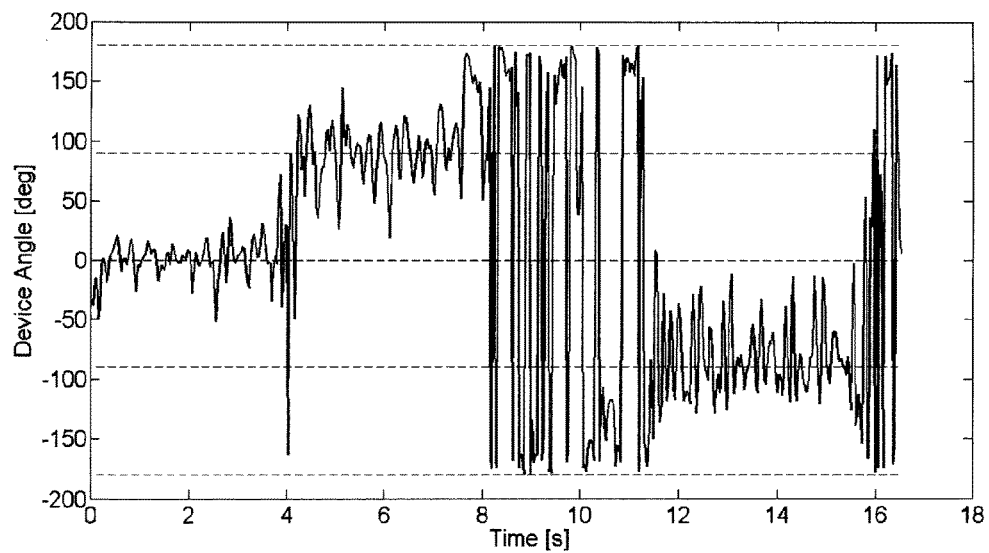
FIG. 10 shows the device angle computed using the arctangent of the aggregated x- and y-flow for the texting use case trajectory.
Figure 11:
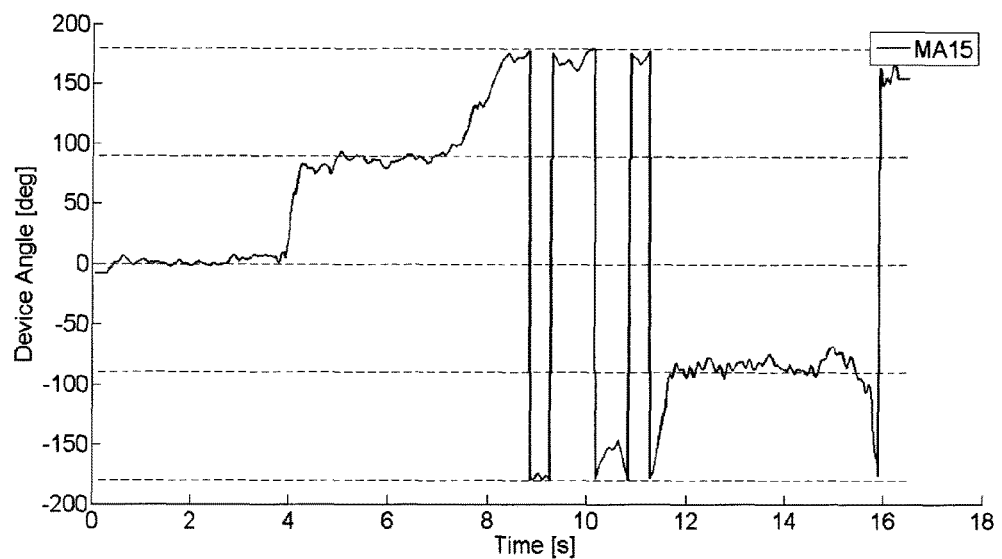
FIG. 11 shows the device angle computed using the arctangent of the smoothed x- and y-components of the aggregate flow (smoothed over 15 frames, equivalent to 0.5 seconds at 30 fps) for the texting use case trajectory.

The aggregated flow of pixels from the flow map is shown in FIG. 9. At a device angle of zero degrees from 0 to 4 s, a strong flow in the positive x-direction is observed with minor oscillations occurring in the y-direction. This is to be expected as there is significant pixel flow from the left to the right side of the image and only a small amount of motion vertically due to the disturbances arising from the user's hand movements and steps. Rotating the device at t=4 s to the 90 degree orientation resulted in a strong flow in the y-direction with a reduced, noisy x-flow. Similar behavior (albeit vice versa) was observed for the remaining orientations of 180 and −90 degrees, starting at t=8 s and t=12 s. The arctangent of the aggregate flows gives the estimate of the device angle with respect to the user as shown in FIG. 10. Though the results are quite noisy, it is clear that the device angle estimates are centered around the four orientations of 0, 90, 180, and −90 degrees. Smoothing the aggregate flows of FIG. 9 using a moving average window size of 15 frames before calculating the device angle resulted in the smoothed angle estimates given in FIG. 11. It is evident from this figure that the device angle is changing by 90 degrees approximately every four seconds.

Dangling Use Case

Figure 12:
FIG. 12 shows the camera view when the device is in the dangling use case at equilibrium position.

FIG. 12 shows a sample image captured at equilibrium position when the device undergoing dangling at an angle of zero degrees. Equilibrium position is defined as the time when the arm is in line with the body.

Three separate tests were conducted to show the various signals when the device was dangling with a known misalignment value of zero, 180, and −90 degrees at equilibrium position. The misalignment value of +90 degrees, while accounted for in the technique design, was ignored in testing as holding the device at such an angle resulted in the camera being completely blocked by the user's hand.

Dangling Use Case—0 Degrees

Figure 13:
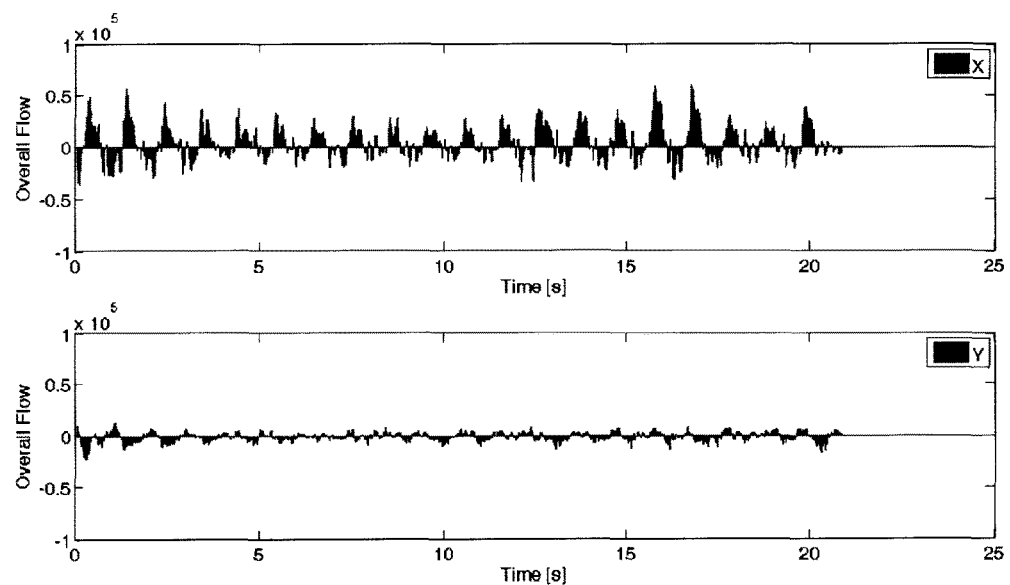
FIG. 13 shows the x- and y-components of the aggregate flow for the dangling use case trajectory at a device angle of zero degrees.

The test was conducted with the camera facing away from the body and pointing towards the direction of the user's motion. Due to the nature of the dangling motion, a strong oscillatory flow was expected in the x-direction. While some oscillatory flow is expected in the y-direction, the amount of translation undergone in the vertical is significantly smaller than that undergone horizontally and greater periodicity is to be expected in the x-flow than in the y-flow. FIG. 13 shows the values of the aggregate flow for the dangling trajectory.

Figure 14:
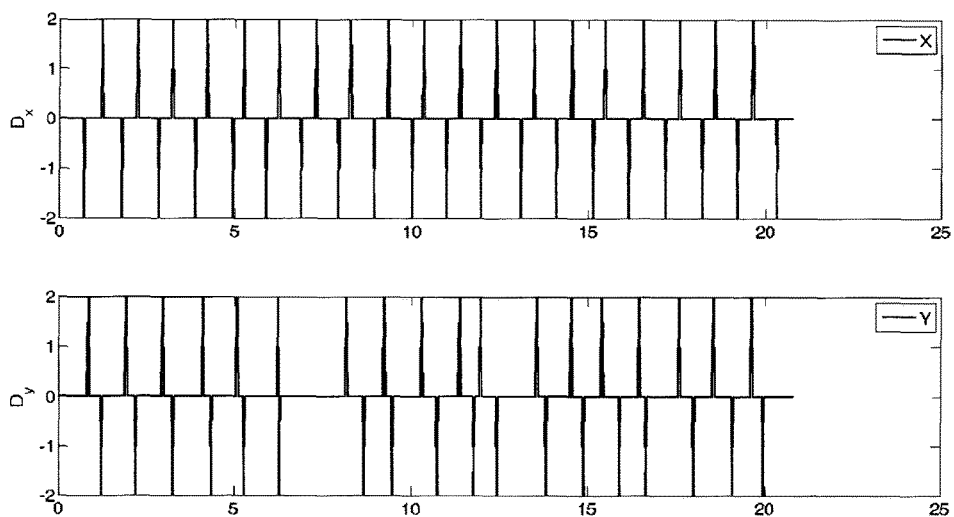
FIG. 14 shows the differencing of the binary thresholded aggregate flow for a device undergoing dangling at an angle of zero degrees. Each spike indicates a change in dangling direction.
Figure 15:
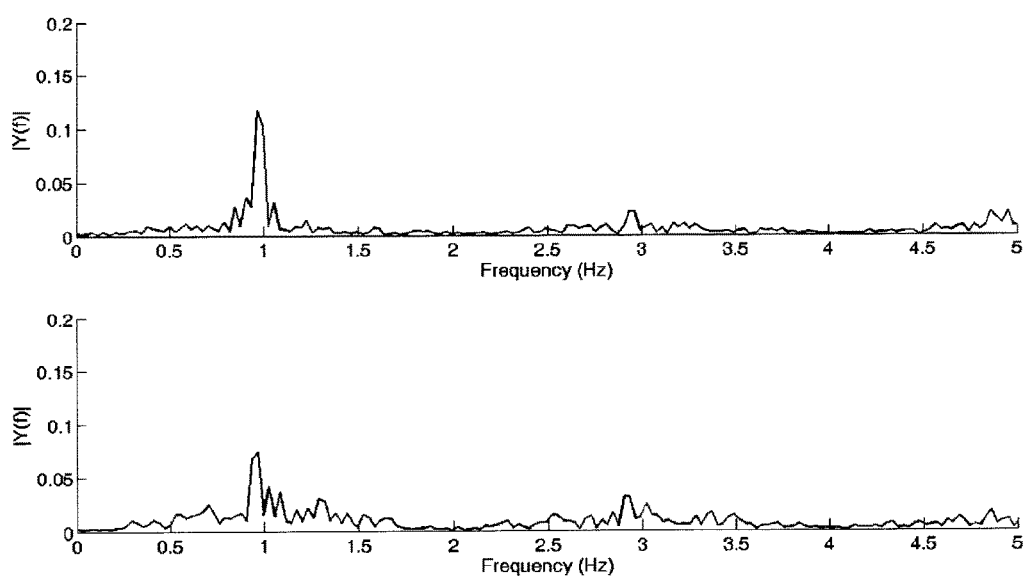
FIG. 15 shows the magnitude spectrum of the differenced binary thresholded aggregate flow for a device undergoing dangling at an angle of zero degrees. The peak indicates the dangling use case and occurs at the dangling frequency.
Figure 16:
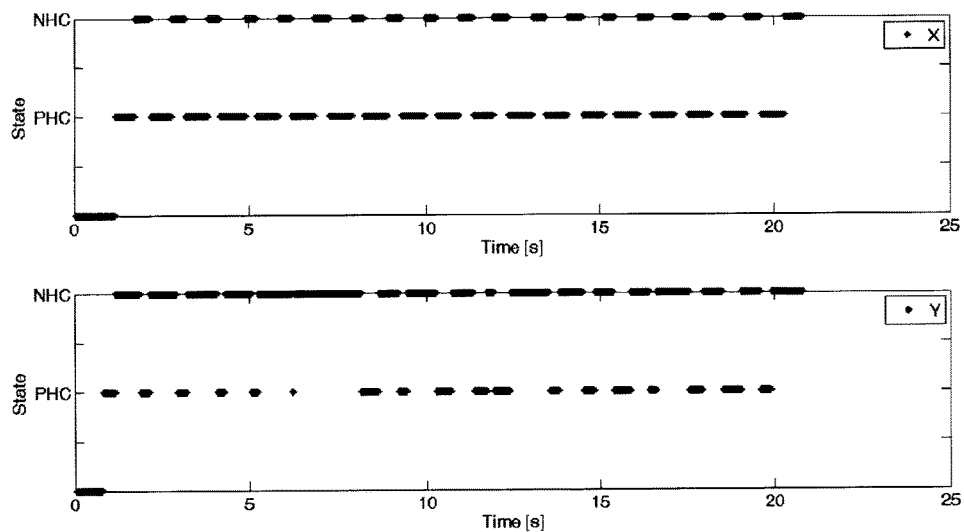
FIG. 16 shows the separation of the dangling motion into positive and negative half-cycles for a device undergoing dangling at an angle of zero degrees.
Figure 17:
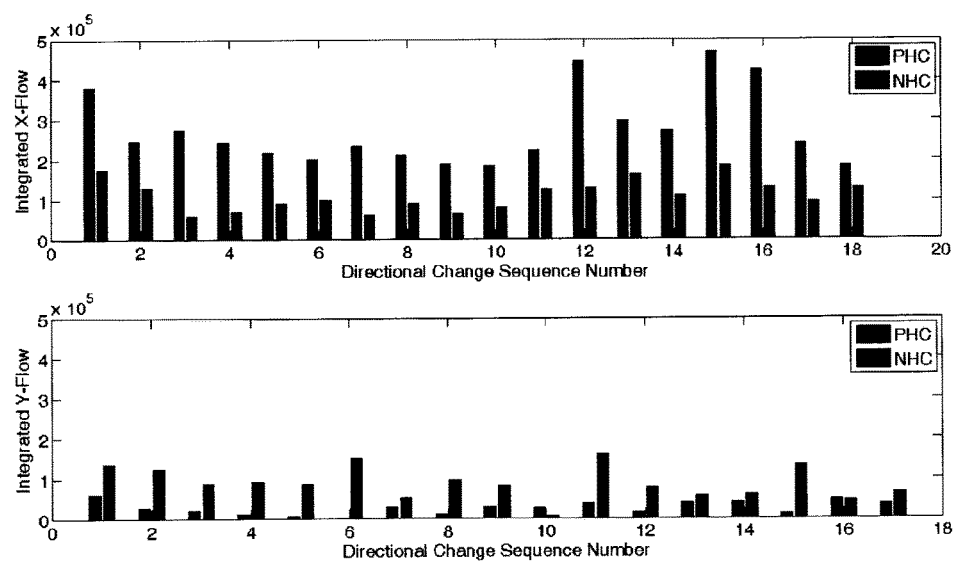
FIG. 17 shows the integrated x- and y-flows during the positive and negative half-cycles of a device undergoing dangling at an angle of zero degrees.
Figure 18:
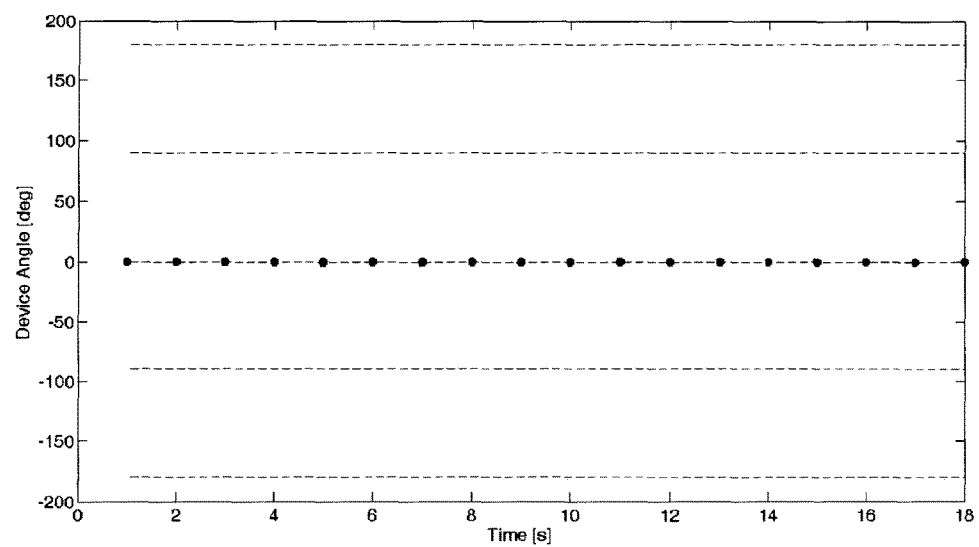
FIG. 18 shows the device angle at equilibrium position for a device undergoing dangling at an angle of zero degrees.
Figure 19:
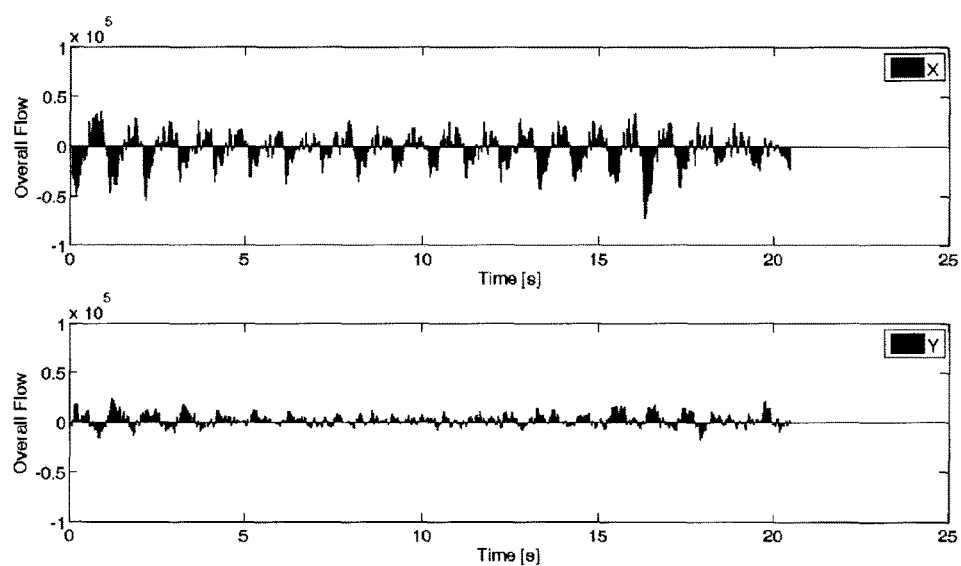
FIG. 19 shows the x- and y-components of the aggregate flow for the dangling use case trajectory at a device angle of 180 degrees.
Figure 20:
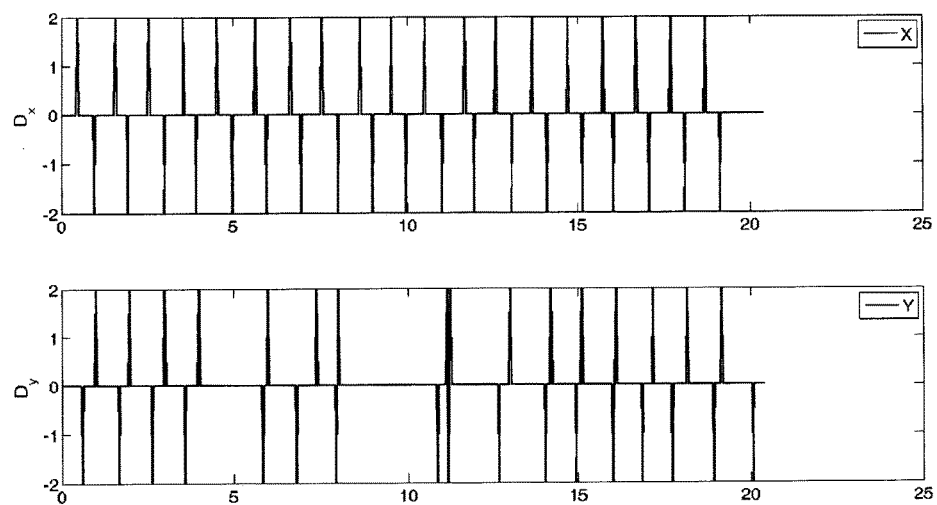
FIG. 20 shows the differencing of the binary thresholded aggregate flow for a device undergoing dangling at an angle of 180 degrees. Each spike indicates a change in dangling direction.
Figure 21:
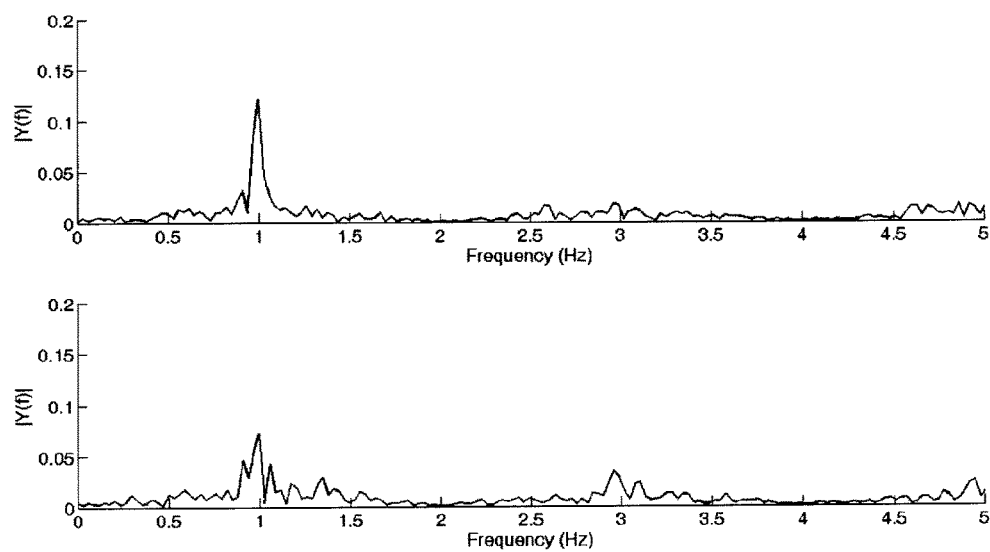
FIG. 21 shows the magnitude spectrum of the differenced binary thresholded aggregate flow for a device undergoing dangling at an angle of 180 degrees. The peak indicates the dangling use case and occurs at the dangling frequency.
Figure 22:
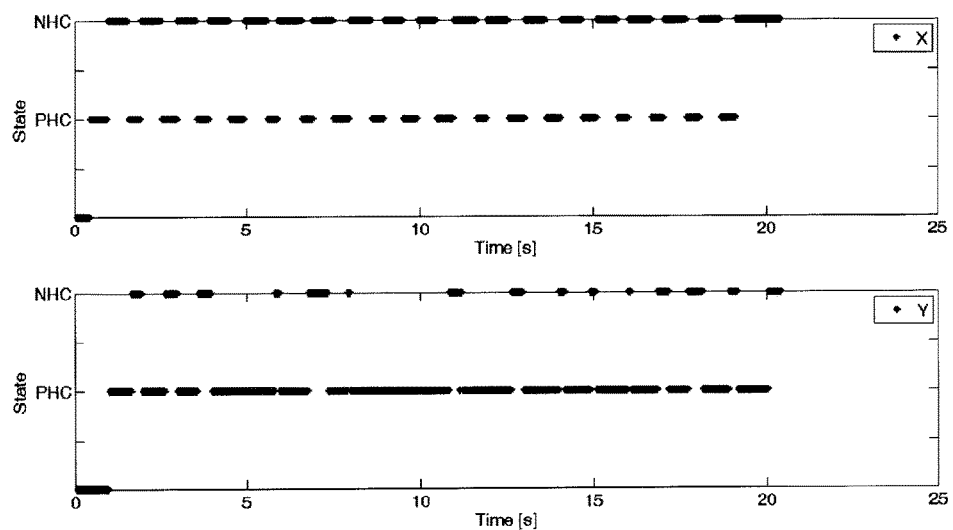
FIG. 22 shows the separation of the dangling motion into positive and negative half-cycles for a device undergoing dangling at an angle of 180 degrees.

By binary thresholding the x- and y-components of the aggregate flow shown in FIG. 13, results in a signal that resembles a periodic square pulse train with values of +1 and −1 when the aggregate flows are positive and negative, respectively. FIG. 14 shows the results of differencing the binary thresholded flow signal. FIG. 15 shows the magnitude spectrum of the differenced signal in FIG. 14 and gives an indication of the degree of the periodicity for the x- and y-components of the optical flow. Inspecting the magnitude spectrum in FIG. 15 shows a clear peak that exceeds the detection threshold value at a frequency of f=0.96 Hz. This value represents the dangling frequency and the fact that the peak is larger for the x-component than the y-component confirms that the device is undergoing dangling at a misalignment angle of either zero or 180 degrees. Using the state machine outlined in FIG. 5 on the binary differenced signal of FIG. 14 yields an array outlining when the device is in the positive and negative half-cycles of the dangling motion. The PHC/NHC state array can be found in FIG. 16. Integrating the flow values of FIG. 12 in each of the half-cycle states determined in FIG. 16 allows for a comparison of the overall translation undergone in each half cycle of the dangling motion (and is shown in FIG. 17). Comparing the values of the integrated flows in each half cycle results in the dangling device angle shown in FIG. 18.

Dangling Use Case—180 Degrees

Figure 23:
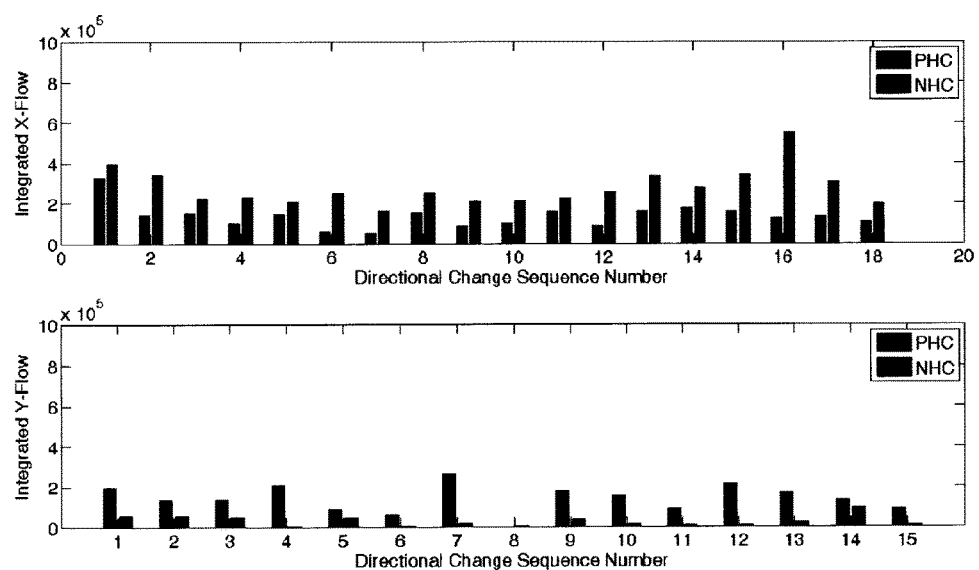
FIG. 23 shows the integrated x- and y-flows during the positive and negative half-cycles of a device undergoing dangling at an angle of 180 degrees.
Figure 24:
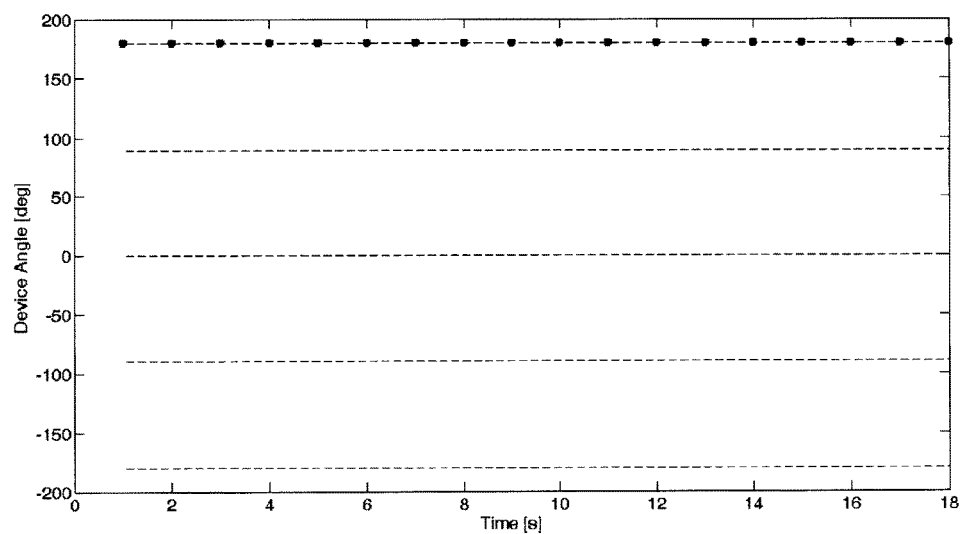
FIG. 24 shows the device angle at equilibrium position for a device undergoing dangling at an angle of 180 degrees.

An identical test as that described above was carried out with the device camera facing out and against the direction of the users motion. The plots of FIGS. 13-18 were regenerated for a device angle of 180 degrees and can be found in FIGS. 19-24, respectively. The main difference expected from this series of plots as compared to those for the zero degree misalignment case was that of FIG. 23, the integrated flows over each half-cycle. In the 180 degree misalignment case, expected results are to see greater x-flow in the negative half-cycles than in the positive half-cycles.

Dangling Use Case—−90 Degrees

Figure 25:
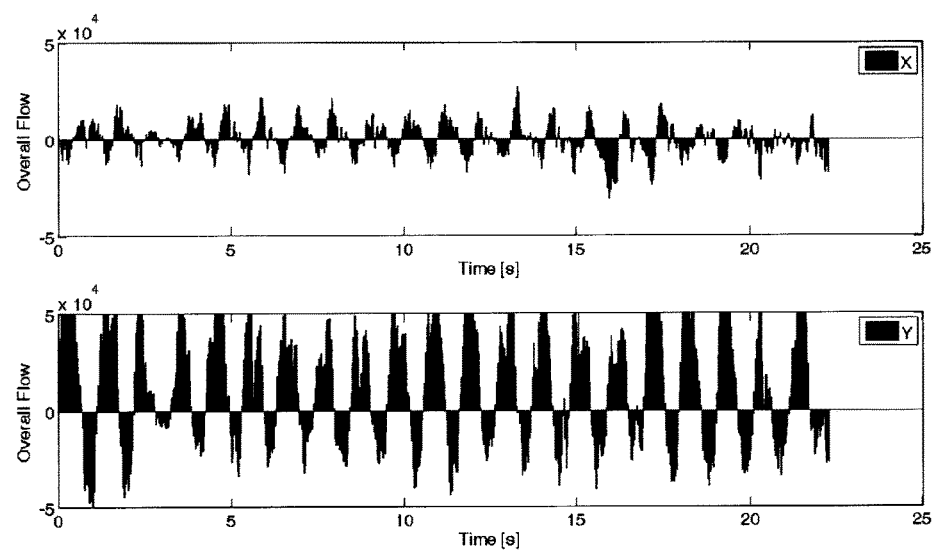
FIG. 25 shows the x- and y-components of the aggregate flow for the dangling trajectory at a device angle of −90 degrees.
Figure 26:
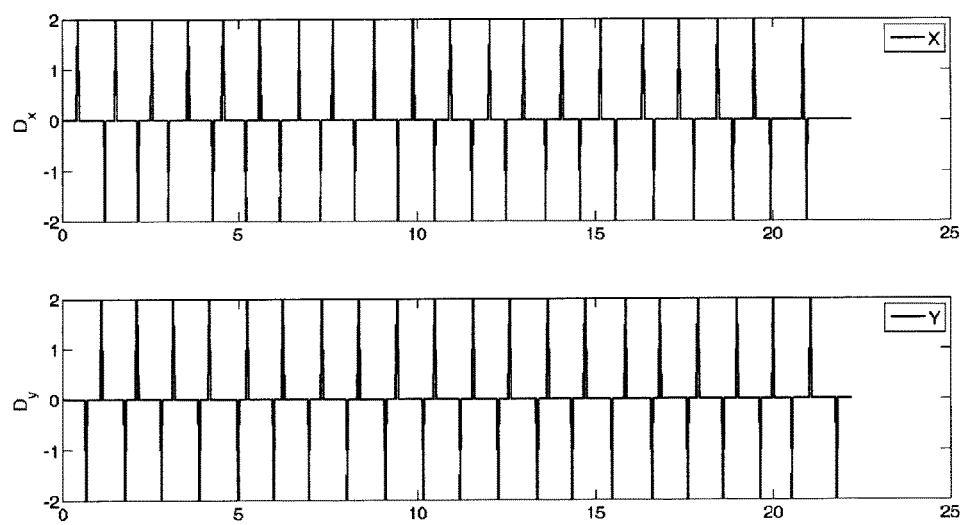
FIG. 26 shows the differencing of the binary thresholded aggregate flow for a device undergoing dangling at an angle of −90 degrees. Each spike indicates a change in dangling direction.
Figure 27:
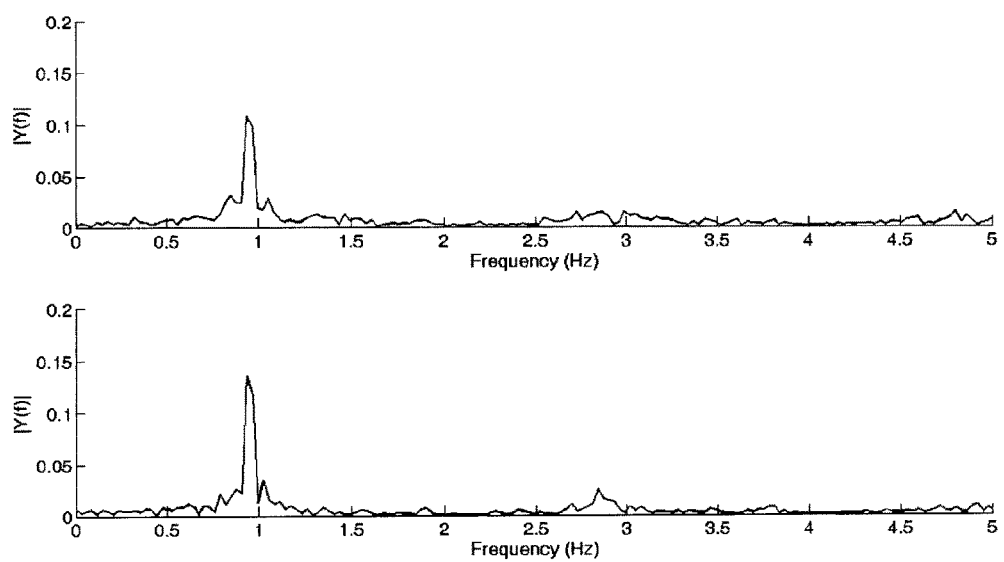
FIG. 27 shows the magnitude spectrum of the differenced binary thresholded aggregate flow for a device undergoing dangling at an angle of −90 degrees. The peak indicates the dangling use case and occurs at the dangling frequency.
Figure 28:
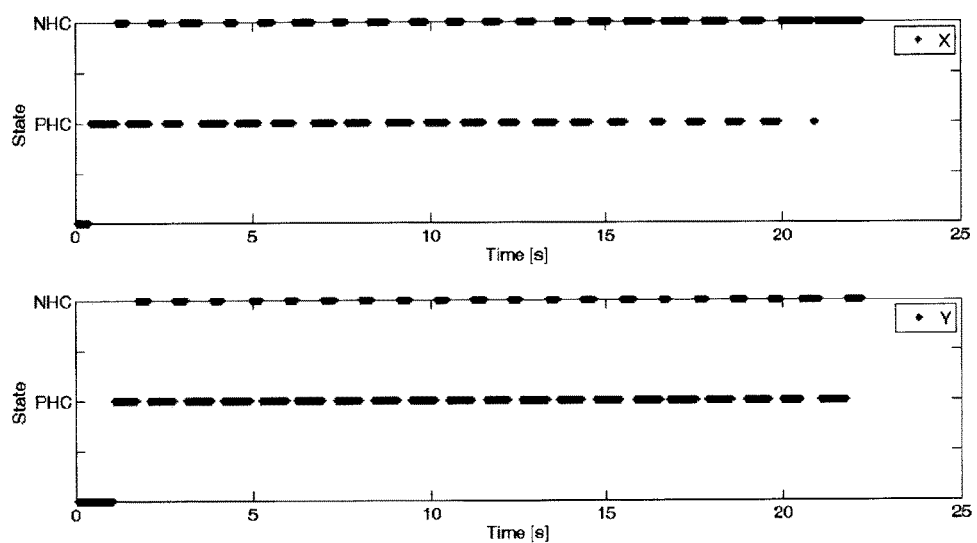
FIG. 28 shows the separation of the dangling motion into positive and negative half-cycles for a device undergoing dangling at an angle of −90 degrees.
Figure 29:
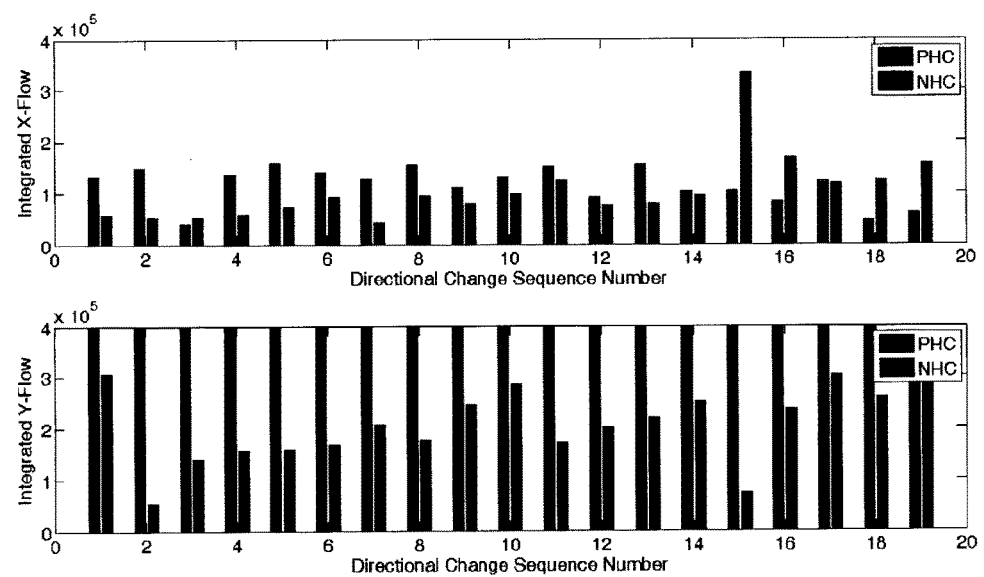
FIG. 29 shows the integrated x- and y-flows during the positive and negative half-cycles of a device undergoing dangling at an angle of −90 degrees.
Figure 30:
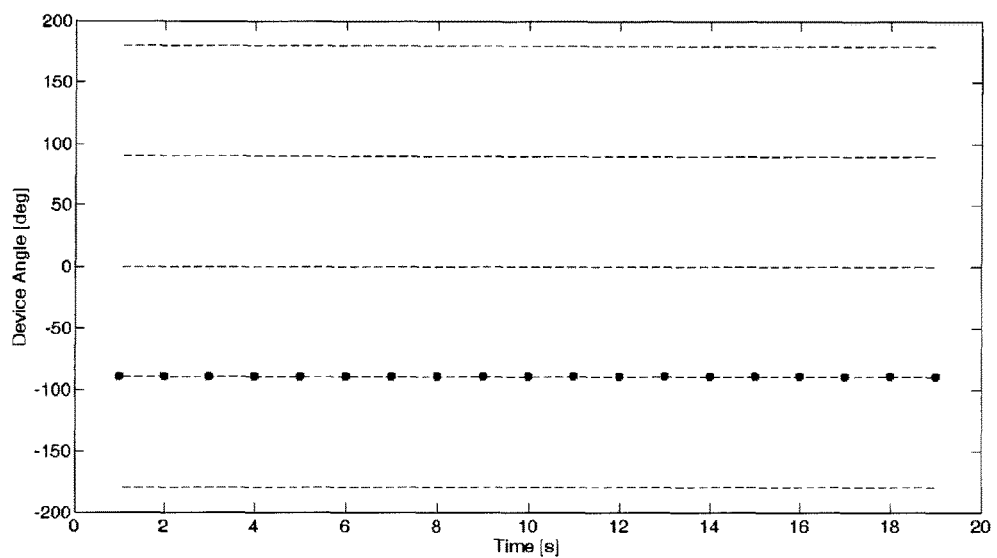
FIG. 30 shows the device angle at equilibrium position for a device undergoing dangling at an angle of −90 degrees.

An identical test as that described above was carried out with the device camera facing out and down towards the ground. The plots of FIGS. 19-24 were regenerated for a device angle of −90 degrees and can be found in FIGS. 25-30. The main difference between the current and previous set of plots can be found in FIGS. 25 and 27 where stronger periodicity can be seen in the y-flow signal.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for determining misalignment between a device and a pedestrian, wherein the device includes an optical sensor for capturing an image, the method comprising the steps of:
   a) calculating optical flow components from an image obtained from the optical sensor, wherein calculating optical flow components comprises an aggregate translation;
   b) determining a use case of the device; and
   c) calculating a misalignment angle using the optical flow components and the use case, wherein one or more techniques for calculating misalignment are selected from multiple techniques based on the use case.

2. A method for determining misalignment between a device and a pedestrian, wherein the device includes an optical sensor for capturing an image, the method comprising the steps of:
   a) determining availability of features in the image;
   b) performing static detection from the image;
   c) calculating optical flow components from an image obtained from the optical sensor, wherein calculating optical flow components comprises an aggregate translation;
   d) determining a use case of the device; and
   e) calculating a misalignment angle using the optical flow components and the use case, wherein one or more techniques for calculating misalignment are selected from multiple techniques based on the use case.

3. A method for determining misalignment between a device and a pedestrian, wherein the device includes an optical sensor for capturing an image, the method comprising the steps of:

a) performing pre-processing on an image obtained from the optical sensor;
b) determining availability of features in the pre-processed image;
c) performing static detection for the device from the pre-processed image;
d) calculating optical flow components from the pre-processed image wherein calculating optical flow components comprises an aggregate translation;
e) determining a use case of the device; and
f) calculating a misalignment angle using the optical flow components and the use case, wherein one or more techniques for calculating misalignment are selected from multiple techniques based on the use case.

4. A method for determining misalignment between a device and a pedestrian, wherein the device includes an optical sensor for capturing an image, the method comprising the steps of:
a) performing pre-processing on an image obtained from the optical sensor;
b) determining availability of features in the pre-processed image;
c) performing static detection from the pre-processed image;
d) calculating optical flow components from the pre-processed image wherein calculating optical flow components comprises an aggregate translation;
e) determining a use case of the device; and
f) calculating a misalignment angle using the optical flow components and the use case if sufficient feature availability is determined, wherein one or more techniques for calculating misalignment are selected from multiple techniques based on the use case, otherwise determining no decision and not calculating a misalignment angle using the optical flow components for this image.

5. The method of claim 4, wherein if the method determines no decision, then using buffered information to calculate the misalignment angle.

6. The method of any one of claim 1, 2, 3, 4, or 5, wherein the method further comprises at least one of:
a) enhancing the calculated misalignment angle using information from other images from the optical sensor;
b) enhancing the calculated misalignment angle using sensor readings, wherein the device includes self-contained sensors capable of providing sensor readings; and
c) enhancing the calculated misalignment angle from absolute navigational information, wherein the device includes a receiver to receive absolute navigational information.

7. The method of any one of claim 1, 2, 3, 4 or 5, wherein the method further comprises calculating a standard deviation for the calculated misalignment angle.

8. A device portable by a pedestrian, the device comprising:
a. an optical sensor for capturing images; and
b. a processor, coupled to receive images from the optical sensor, and operative to determine the misalignment between the device and the pedestrian, wherein the processor is operative to:
i) perform pre-processing on an image obtained from the optical sensor;
ii) calculate optical flow components from the image, wherein calculating optical flow components comprises an aggregate translation;
iii) determine a use case of the device; and
iv) calculate a misalignment angle using the optical flow components wherein one or more techniques for calculating misalignment are selected from multiple techniques based on the use case.

9. The method of claim 6, wherein the method further comprises calculating a standard deviation for the calculated misalignment angle.

* * * * *